United States Patent
Pfeiffer et al.

(10) Patent No.: US 9,964,095 B2
(45) Date of Patent: May 8, 2018

(54) METHOD AND SYSTEM FOR SERVICING WIND TURBINE ROTOR

(71) Applicant: General Electric Company, Schenectady, NY (US)

(72) Inventors: Gaylon Mitchell Pfeiffer, Tampa, FL (US); Ulrich Werner Neumann, Simpsonville, SC (US); Brent Hamilton Holloway, Greenville, SC (US); Michael Royce Johnson, Campton, NH (US); Kevin Thomas Costain, Baltic, SD (US); Forrest Christopher Hach, Lake Benton, MN (US); Howard Lee Hansen, Jr., Waco, TX (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 543 days.

(21) Appl. No.: 14/257,538

(22) Filed: Apr. 21, 2014

(65) Prior Publication Data

US 2015/0300175 A1  Oct. 22, 2015

(51) Int. Cl.
*F03D 1/06* (2006.01)
*F03D 13/10* (2016.01)
*F03D 80/50* (2016.01)

(52) U.S. Cl.
CPC ......... *F03D 1/0658* (2013.01); *F03D 13/10* (2016.05); *F03D 80/50* (2016.05);
(Continued)

(58) Field of Classification Search
CPC ........ F03D 1/001; F03D 1/003; F03D 1/0658; F05B 2230/61; F05B 2240/916
See application file for complete search history.

(56) References Cited

U.S. PATENT DOCUMENTS

2007/0290426 A1* 12/2007 Trede ............... F03D 1/001
  269/1
2010/0139062 A1* 6/2010 Reed ............... F03D 13/10
  29/23.51
(Continued)

FOREIGN PATENT DOCUMENTS

| CA | 2692705 A1 | 8/2010 |
| WO | 2011064659 A2 | 6/2011 |
| WO | 2012065613 A9 | 5/2012 |

OTHER PUBLICATIONS

Printout of Cabridge Online dictionary, definition of sling.*
(Continued)

*Primary Examiner* — Moshe Wilensky
(74) *Attorney, Agent, or Firm* — Douglas D. Zhang; GE Global Patent Operation

(57) ABSTRACT

A method for enabling servicing of a wind turbine rotor includes coupling a support cable to the blade root, the support cable extends from the blade root to a hub of the wind turbine. A lowering step lowers a rotor blade relative to the hub using the support cable so the rotor blade is spaced apart from the hub by an initial vertical distance. An installing step installs a rotor blade sling on the rotor, the rotor blade sling supports the rotor blade. Other steps are used for coupling the rotor blade to the rotor blade sling, lowering the rotor blade such that the rotor blade is spaced apart from the hub by a distance greater than the initial vertical distance, de-coupling the support cable from the blade root, and interposing a rotor servicing fixture between the rotor blade and hub. The rotor servicing fixture is configured to transport a rotor part.

19 Claims, 25 Drawing Sheets

(52) U.S. Cl.
CPC ..... *F05B 2230/61* (2013.01); *F05B 2240/916* (2013.01); *Y02E 10/721* (2013.01); *Y02E 10/728* (2013.01); *Y02P 70/523* (2015.11)

(56) References Cited

U.S. PATENT DOCUMENTS

| | | | |
|---|---|---|---|
| 2011/0042632 A1* | 2/2011 | Van Berlo | B66C 23/18 254/264 |
| 2011/0173811 A1* | 7/2011 | Iversen | F03D 1/003 29/889.1 |
| 2011/0298232 A1* | 12/2011 | Reger | B66C 1/10 294/81.5 |
| 2012/0141280 A1* | 6/2012 | Holling | F03D 80/50 416/204 R |
| 2012/0201693 A1* | 8/2012 | Pettersson | F03D 1/0658 416/244 R |
| 2014/0010658 A1 | 1/2014 | Nielsen | |
| 2015/0232307 A1 | 8/2015 | Holloway et al. | |

OTHER PUBLICATIONS

Printout of Dictionary.com definition of sling.*
Printout of Merrian-Webster online dictionary, definition of sling.*

* cited by examiner

METHOD AND SYSTEM FOR SERVICING WIND TURBINE ROTOR

FIELD OF THE INVENTION

The present subject matter relates generally to wind turbines and, more particularly, to an improved method and system for enabling servicing of the rotor of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of the wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy. A power converter typically regulates the flow of electrical power between the generator and a grid.

Typically, to initially install a rotor blade onto the wind turbine hub and/or to remove or lower one of the existing rotor blades from the hub, a significantly large crane must be transported to the wind turbine site in order to provide a means for raising and/or lowering the rotor blade relative to the hub. Unfortunately, it is often extremely expensive to both transport the crane to the wind turbine site and operate the crane for the amount of time necessary to install and/or remove/lower the rotor blade(s). As a result, the costs of employing such large cranes currently accounts for a significant portion of the overall costs associated with initial wind turbine installations and rotor maintenance or service operations.

Accordingly, an improved method and related system for lowering wind turbine rotor blades to enable rotor service that do not require the use of a significantly large crane would be welcomed in the technology, and the improved method and related system would make wind power more economically competitive with other forms of power generation.

BRIEF DESCRIPTION OF THE INVENTION

Aspects and advantages of the invention will be set forth in part in the following description, or may be obvious from the description, or may be learned through practice of the invention.

In one aspect, a method for enabling servicing of a rotor of a wind turbine is provided. The method includes a coupling step that couples at least one support cable to the blade root. The support cable extends from the blade root and into a hub of the wind turbine. A lowering step lowers a rotor blade relative to the hub using the support cable such that the rotor blade is spaced apart from the hub by an initial vertical distance. An installing step installs a rotor blade sling on the rotor, and the rotor blade sling is configured to support the rotor blade. A coupling step couples the rotor blade to the rotor blade sling. A lowering step lowers the rotor blade such that the rotor blade is spaced apart from the hub by a distance greater than the initial vertical distance. A de-coupling step de-couples the support cable(s) from the blade root, and an interposing step interposes a rotor servicing fixture between the rotor blade and the hub. The rotor servicing fixture is configured to transport a rotor part, and the rotor blade maintains connection to the hub or rotor by either the support cable(s) or the rotor blade sling.

In another aspect, a method for enabling servicing of a rotor of a wind turbine includes a lowering step that lowers a rotor blade relative to the hub using a support cable such that the rotor blade is spaced apart from the hub by an initial vertical distance. An interposing step interposes a rotor servicing fixture between the rotor blade and the hub. The rotor servicing fixture is configured to transport a rotor part from or to the rotor or hub. The rotor servicing fixture is generally C-shaped so that it can fit around the hub; and it includes an attachment point located above a rotor part mounting area. The rotor servicing fixture includes a counterweight located at an end of an upper arm of the rotor servicing fixture. The rotor part mounting area is generally Y-shaped. At least a portion of a hub facing portion of the rotor servicing fixture includes one or more padded members, and the padded members are configured to protect the hub. The rotor servicing fixture includes one or more legs configured to maintain the rotor servicing fixture in an upright position when the rotor servicing fixture is resting on a ground surface. A support nut is mounted at least partially though the blade root, and a coupling step includes coupling the support cable to the blade root by coupling the support cable to a coupling device extending from the support nut. An installing step installs a cable translation device within the hub, and operatively associating the support cable with the cable translation device such that the support cable extends from the support nut through a portion of the cable translation device. The rotor blade sling is configured to both support the rotor blade and keep the area above the downwardly pointing rotor blade free from obstructions, so that the rotor servicing fixture may be inserted between the rotor blade and hub.

In a further aspect, a system for enabling servicing of a rotor of a wind turbine includes a plurality of cable translation devices configured to be positioned within the hub, each of the plurality of cable translation devices comprising a cable hoist. A plurality of support nuts are configured to be installed at least partially through a blade root of the rotor blade. A plurality of support cables, where each of the plurality of support cables are configured to be placed in operative association with one of the plurality of cable translation devices and being coupled to one of the plurality of support nuts. A rotor blade sling is configured to be positioned on the rotor, and the rotor blade sling is configured to support the rotor blade. A rotor servicing fixture is configured to be inserted between the rotor blade and a hub, and the rotor servicing fixture is configured to transport a rotor part to and/or from the rotor or hub. The cable translation devices are configured to be operated such that the support cables are moved relative to the cable translation devices in a manner that causes the rotor blade to be lowered or raised relative to the hub. The rotor blade sling is configured to support the rotor blade when the support cables are removed from the rotor blade. The rotor servicing fixture is configured to transport a rotor part from or to the rotor or hub. The rotor blade sling is configured to both support the rotor blade and keep the area between the hub and the downwardly pointing rotor blade free from obstructions, so that the rotor servicing fixture may be inserted between the rotor blade and hub. This permits large objects, such as a pitch bearing, to be removed and installed while the downwardly pointing rotor blade is still attached to the rotor via the rotor blade sling.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
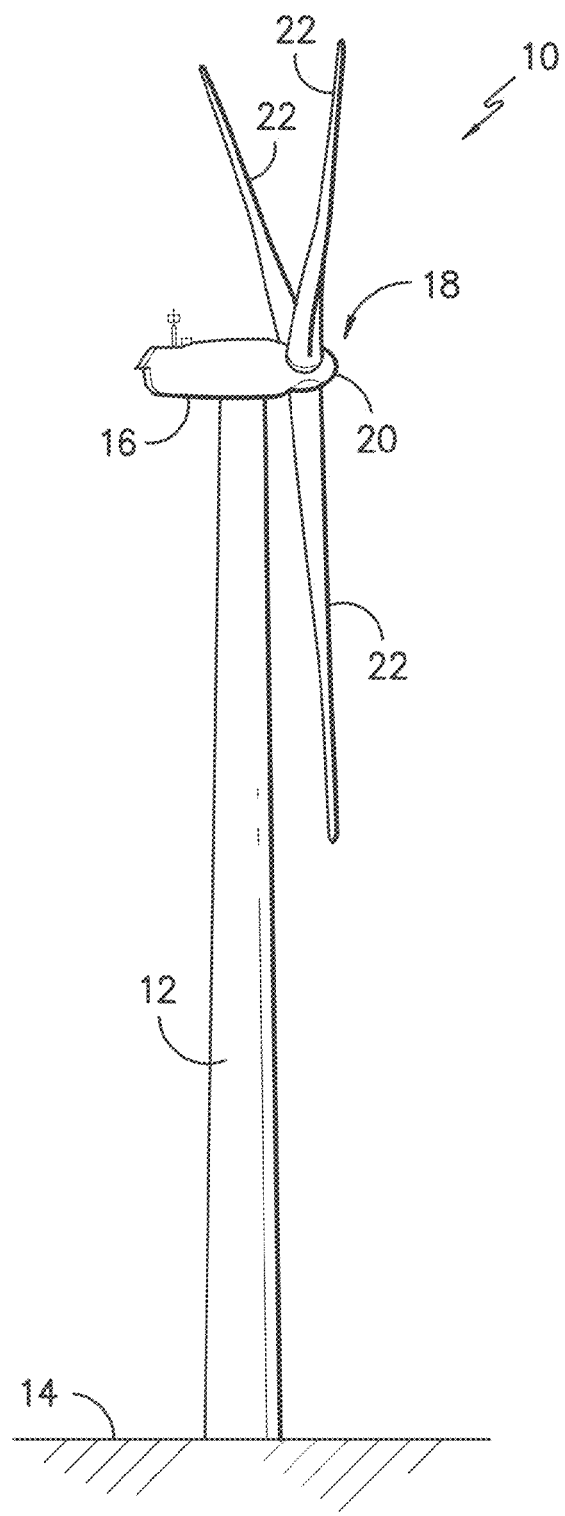
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method and system for lowering a rotor blade from a hub and removing or installing a rotor part without having to use a crane to lower the entire rotor to the ground. Specifically, as will become apparent from the description provided below, the disclosed method and system avoids the use of a large, expensive crane capable of raising or lowering the entire rotor, thereby significantly reducing the costs associated with blade lowering and re-installation.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
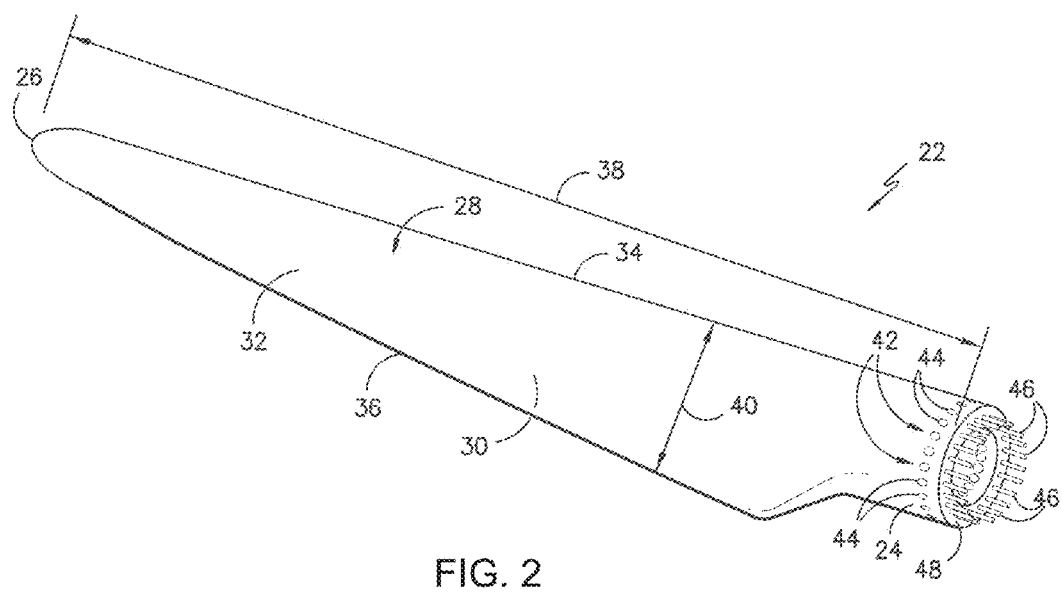
FIG. 2 illustrates a perspective view of one of the rotor blades of the wind turbine shown in FIG. 1.

Referring now to FIG. 2, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 28 extends from the blade root 24 to the blade tip 26.

Moreover, as shown in FIG. 2, the rotor blade 22 may also include a plurality of T-bolts or root attachment assemblies 42 for coupling the blade root 24 to the hub 20 of the wind turbine 10. In general, each root attachment assembly 42 may include a barrel nut 44 mounted within a portion of the blade root 24 and a root bolt 46 coupled to and extending from the barrel nut 44 so as to project outwardly from a root end 48 of the blade root 24. By projecting outwardly from the root end 48, the root bolts 46 may generally be used to couple the blade root 24 to the hub 20 via a pitch bearing 150 of the wind turbine 10. For example, the pitch bearing 150 may define a plurality of bolt holes 151 configured to receive the root bolts 46. Additionally, as will be described below, a portion of such root bolts 46 may also be utilized when the rotor blade 22 is being lowered or removed from and/or re-installed onto the hub 20.

It should be appreciated that, although the methods will generally be described with reference to lowering a rotor blade 22 from the hub 20 of wind turbine 10, the various method steps and system components disclosed herein may similarly be used to re-install the rotor blade 22 onto the hub 20 by simply reversing the order in which the method is performed. It should also be appreciated that, although the methods will be described herein as being performed in a particular order, the methods may generally be performed in any suitable order that is consistent with the disclosure provided herein.

Figure 3:
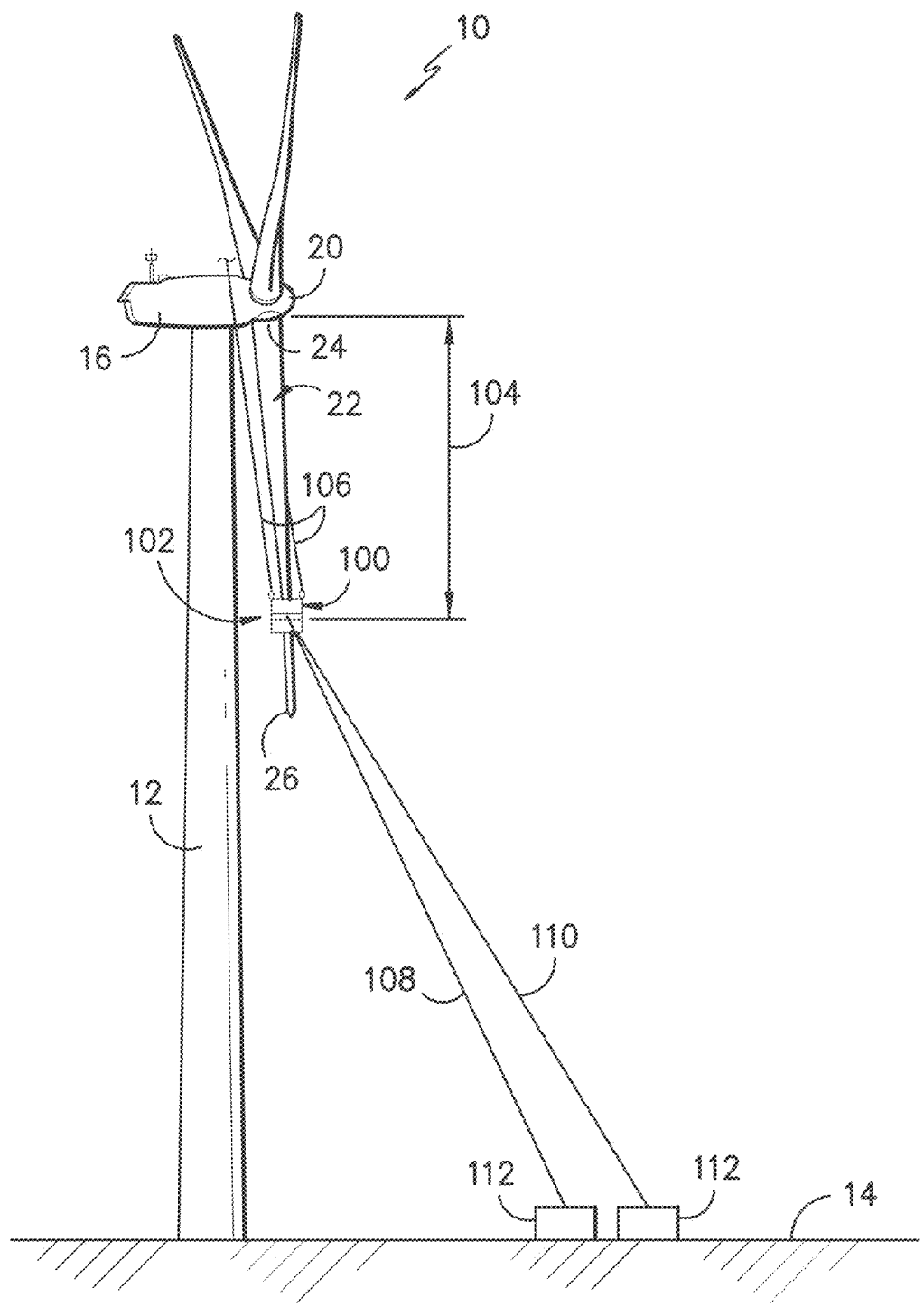
FIG. 3 illustrates another perspective view of the wind turbine shown in FIG. 1, particularly illustrating a rotor blade to be removed from the wind turbine positioned in a generally vertical orientation relative to a support surface of the wind turbine and a blade sock installed onto the rotor blade.

Referring particularly to FIG. 3, the rotor blade 22 to be lowered may be initially rotated to a vertically downward position (e.g., a 6 o'clock position) such that the blade 22 has a generally vertical orientation relative to the support surface 14 of the wind turbine 10. For example, as shown in FIG. 3, the rotor blade 22 is extending vertically downward from the hub 20 such that the blade tip 26 is pointing towards the support surface 14. It should be appreciated that, due to a tilt angle and/or cone angle of the wind turbine 10, the rotor blade 22 may be angled slightly away from the tower 12 when moved to the vertically downward position.

In several embodiments, once the rotor blade 22 is rotated to the vertically downward position, a blade sock 100 may be installed onto the blade 22 at an intermediate location 102 defined between the blade root 24 and the blade tip 26. In one embodiment, the intermediate location 102 may correspond to a location defined along an outboard section of the rotor blade 22, such as at a location spaced apart from the blade root 24 by a distance 104 that is greater that about 50% of the blade span 38. For example, the distance 104 may range from about 50% of the span 38 to about 95% of the span 38, such as from about 65% of the span 38 to about 95% of the span 38 or from about 75% of the span 38 to about 90% of the span 38 and any other subranges therebetween.

As shown in FIG. 3, to install the blade sock 100 onto the rotor blade 22, one or more lift cables 106 may be secured to the blade sock 100 and may extend upward to an up-tower location, such as at a location on and/or within the hub 20 or the nacelle 16. For instance, in one embodiment, the lift cable(s) 106 may extend upward from the blade sock 102 to personnel located within and/or on top of the hub 20 or the nacelle 16. Regardless, the lift cable(s) 106 may be used to lift the blade sock 100 vertically upwards relative to the support surface 14 to allow the sock 100 to be installed around the rotor blade 22 at the intermediate location 102. For instance, as will be described below, the blade sock 100 may define a closed shape configured to extend around the entire outer perimeter of the rotor blade 22. Thus, when lifting the blade sock 100 via the lift cable(s) 102, the sock 100 may be carefully aligned with the rotor blade 22 such that the blade tip 26 is received within the sock 100.

Additionally, one or more sock cables 108, 110 may also be coupled to the blade sock 100 and may extend downward to a location adjacent to the support surface 14. For instance, in the illustrated embodiment, the system includes a first sock cable 108 and a second sock cable 110 coupled between the blade sock 100 and corresponding winches 112 disposed on and/or adjacent to the support surface 14. The sock cables 108, 110 may, for example, be utilized to assist in aligning the blade sock 100 with the rotor blade 22 as the sock 100 is being lifted up onto the blade 22 via the lift cables 106. In addition, as will be described below, the sock cable(s)

108, 110 may also be used as a means for tightening the blade sock 100 around the rotor blade 22 at the intermediate location 102 and/or for applying a force through the blade sock 100 in order to adjust and/or control the orientation of the rotor blade 22 as it is being lowered below the hub 20.

Figure 4:
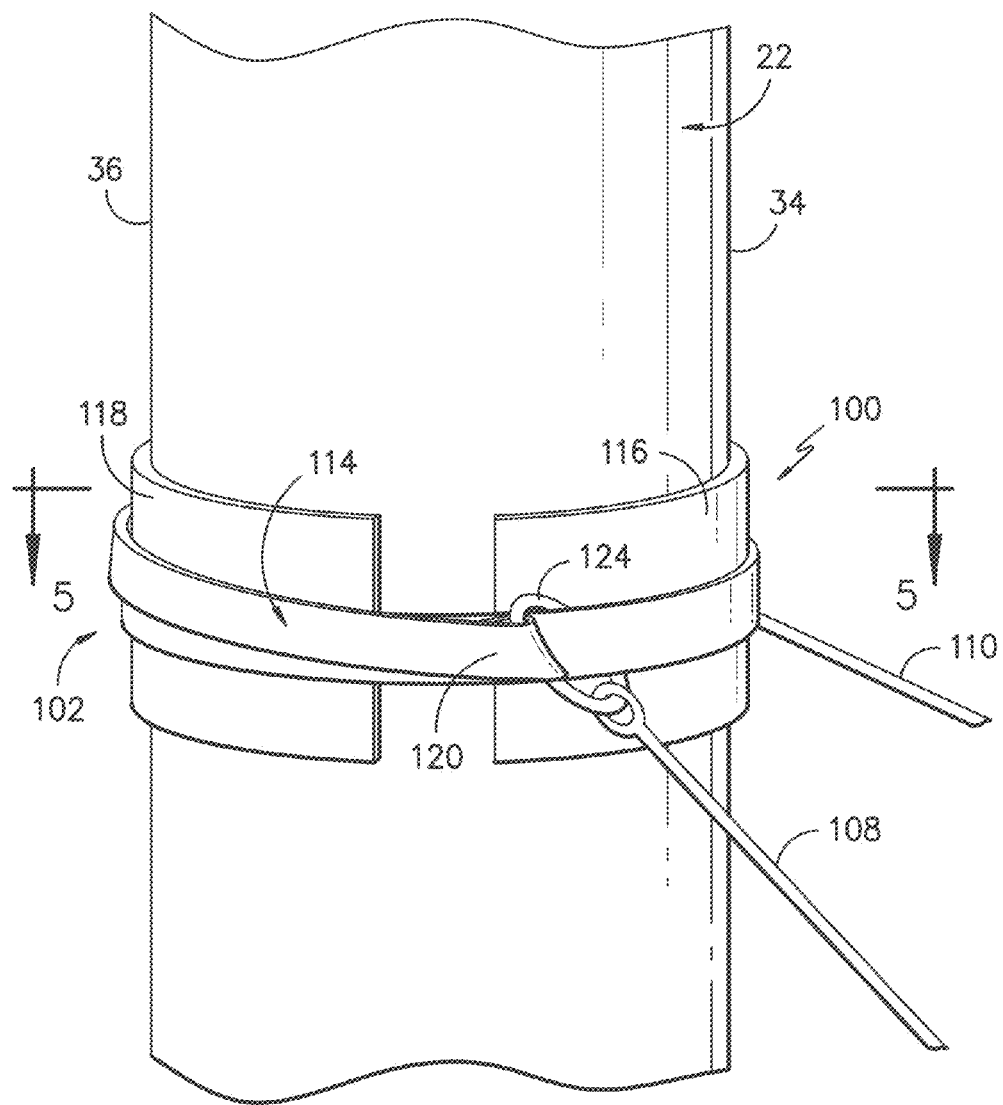
FIG. 4 illustrates a close-up, partial perspective view of the rotor blade and the blade sock shown in FIG. 3.
Figure 5:
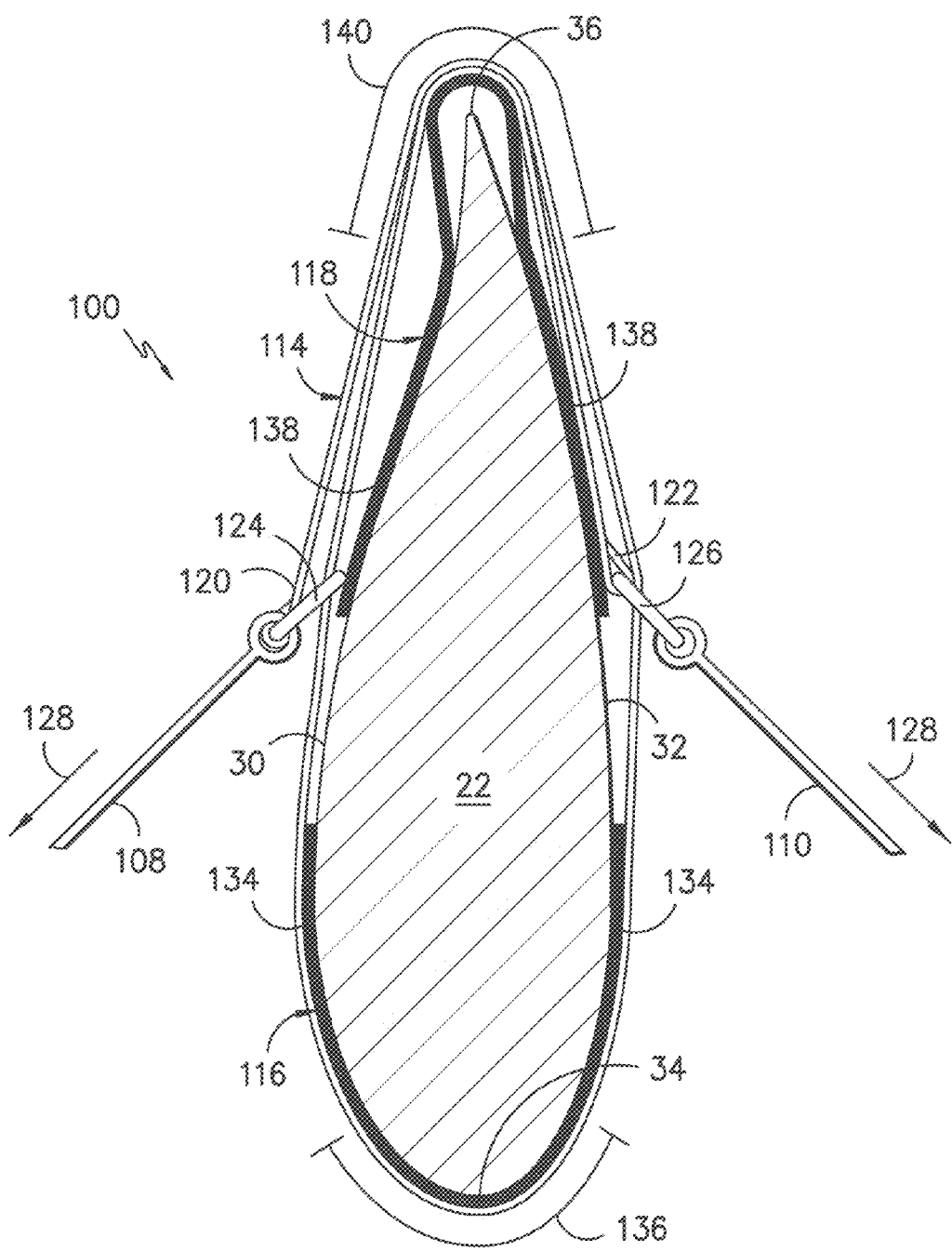
FIG. 5 illustrates a cross-sectional view of the rotor blade and blade sock shown in FIG. 4 taken about line 5-5.
Figure 6:
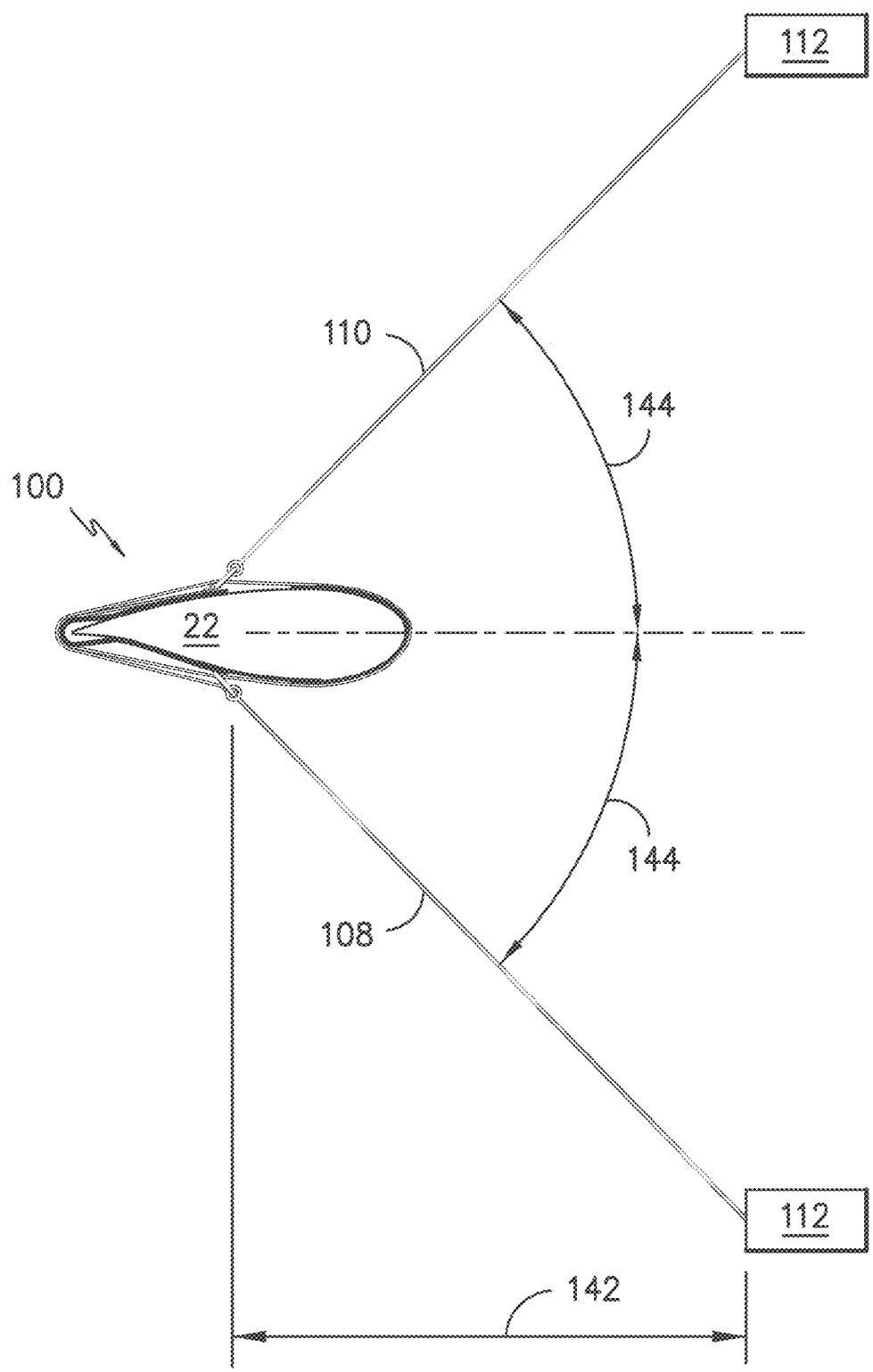
FIG. 6 illustrates a top-down view of the cross-section shown in FIG. 5 relative to a support surface of the wind turbine, particularly illustrating sock cables extending from the blade sock to corresponding winches supported on and/or adjacent to the support surface.

Referring now to FIGS. 4-6, differing views of one embodiment of the blade sock 100 described above are illustrated in accordance with aspects of the present subject matter. Specifically, FIG. 4 illustrates a close-up, perspective view of the blade sock 100 installed onto the rotor blade 22 at the intermediate location 102 with the lift cables 106 being removed and FIG. 5 illustrates a cross-sectional view of the blade sock 100 shown in FIG. 4 taken about line 5-5. Additionally, FIG. 6 illustrates top-down view of the cross-section shown in FIG. 5, particularly illustrating the sock cables 108, 110 extending from the blade sock 100 to corresponding winches 112 disposed on and/or adjacent to the support surface 14.

As particularly shown in FIGS. 4 and 5, the blade sock 100 may include a sock strap 114 generally defining a closed shape configured to extend around the outer perimeter of the rotor blade 22. In addition, the blade sock 100 may include one or more edge supports 116, 118 positioned between the sock strap 114 and the rotor blade 22. For example, as shown in the illustrated embodiment, the blade sock 100 includes both a leading edge support 116 positioned between the sock strap 114 and the rotor blade 22 around the location of the leading edge 34 of the blade 22 and a trailing edge support 118 positioned between the sock strap 114 and the rotor blade 22 around the location of the trailing edge 36 of the blade 22.

In general, the sock strap 114 may be configured to be tightened around the outer perimeter of the rotor blade 22 in order to secure the blade sock 100 to the blade 22 at the intermediate location 102. In several embodiments, the sock strap 114 may be configured to be self-tightening. For example, as shown in FIG. 5, the sock strap 114 may extend lengthwise between a first end 120 and a second end 122. In addition, the sock strap 114 may include suitable coupling mechanisms (e.g., mount rings or hooks or any other suitable coupling device) positioned at the ends 120, 122 of the strap 114 for coupling each end 120, 122 to one of the sock cables 108, 110. Specifically, as shown in FIG. 5, a first mount ring 124 may be secured to the first end 120 of the sock strap 114 and a second mount ring 126 may be secured to the second end 122 of the sock strap 114. In such an embodiment, the sock strap 114 may be configured to be looped around the outer perimeter of the rotor blade 22 in a partially overlapping manner such that the first mount ring 124 is disposed on one side of the rotor blade 22 (e.g., the pressure side 30) and the second mount ring 126 is disposed on the opposite side of the rotor blade 22 (e.g., the suction side 32). As such, when the sock cables 108, 110 are coupled to the mount rings 124, 126 and subsequently pulled or otherwise tensioned (e.g., via the winches 112) so as to apply a tightening force at each end 120, 122 of the sock strap 114 (indicated by arrows 128 in FIG. 5), the strap 114 may be configured to tighten around the outer perimeter of the rotor blade 22, thereby securing the blade sock 100 to the rotor blade 22.

The edge supports 116, 118 of the blade sock 100 may generally correspond to any suitable rigid support-type members configured to prevent damage to the leading and trailing edges 34, 36 of the rotor blade 22 as the sock strap 114 is tightened around the blade 22 and/or as the blade sock 100 is used to at least partially support the weight of the rotor blade 22 (as will be described below). For example, as shown in FIG. 5, the leading edge support 116 may include side portions 134 configured to extend along portions of the pressure and suction sides 30, 32 of the rotor blade 22 and may also include an edge portion (indicated by bracket 136) extending between the side portions 134 around leading edge 34. Specifically, the edge portion 136 may be configured to define a curved profile generally corresponding to the curved profile of the leading edge 34 of the blade 22 such that the edge portion 136 wraps around and provides a nesting configuration for the leading edge 34. Similarly, the trailing edge support 118 may include side portions 138 configured to extend along portions of the pressure and suction sides 30, 32 of the rotor blade 22 and may also include an edge portion (indicated by bracket 140) extending between the side portions 138 around the trailing edge 36. However, unlike the edge portion 136 of the leading edge support 116, the edge portion 140 may be configured to extend around the trailing edge 36 such that a gap is defined between the trailing edge 36 and the corresponding support 116, thereby providing a buffer to prevent compression forces applied via the tightened sock strap 114 from being directed through the trailing edge 36.

It should be appreciated that the edge supports 116, 118 may generally be configured to be formed from any suitable rigid material. For instance, in one embodiment, the edge supports 116, 118 may be formed from a fiber-reinforced laminate composite, such as a carbon and/or glass fiber-reinforced laminate. Alternatively, the edge supports 116, 118 may be formed from any other suitable rigid material, such as any suitable metal and/or any suitable rigid polymer-containing material. Additionally, in several embodiments, for the portions of the edge supports 116, 118 configured to contact the outer surface of the rotor blade 22, the edge supports 116, 118 may include an inner layer (not shown) formed from a suitable cushioning material in order to protect the blade's outer surface. For instance, the inner layer may be formed from a foamed material or any other suitable soft and/or cushioning material.

It should also be appreciated that, although the edge supports 116, 118 are shown in the illustrated embodiments as two separate components, the edge supports 116, 118 may, instead, be configured as a single component configured to extend around the entire outer perimeter of the rotor blade 22. Additionally, in alternative embodiments, the blade sock 100 may only include one of the edge supports 116, 118, such as by only including the trailing edge support 118.

Referring to FIG. 6, as indicated above, the sock cables 108, 110 may, in one embodiment, be configured to be coupled between the blade sock 100 and corresponding winches 112 disposed on and/or adjacent to the wind turbine's support surface 14. In such an embodiment, the positioning of the winches 112 relative to the position of the rotor blade 22 (as mounted on the hub 20) may be selected to ensure that the winches 112 are spaced sufficiently apart from the rotor blade 22 to allow for the orientation of the blade 22 to be adjusted and/or controlled as it is lowered from the hub 20. For example, as shown in FIG. 6, the winches 112 may be positioned a horizontal distance 142 from the rotor blade 22, which may vary depending on the overall length of the blade's span 38. In addition, the winches 112 may be spaced apart from one another in a cross-wise direction such that each sock cable 108, 110 extends from the blade sock 100 at a given cable angle. For instance, in one embodiment, the cable angle 144 may range from about 30 degrees to about 60 degrees, such as from about 35 degrees to about 55 degrees or from about 42 degrees to about 48 degrees and any other subranges therebetween.

It should be appreciated that, as an alternative to the winches 112, the sock cables 108, 110 (which may also be referred to as tag lines) may be coupled to and/or held in position by any other suitable device, object and/or person positioned on and/or adjacent to the support surface 13. For instance, in one embodiment, sock cables 108, 110 may simply be held by personnel standing on the support surface 14.

Figure 7:
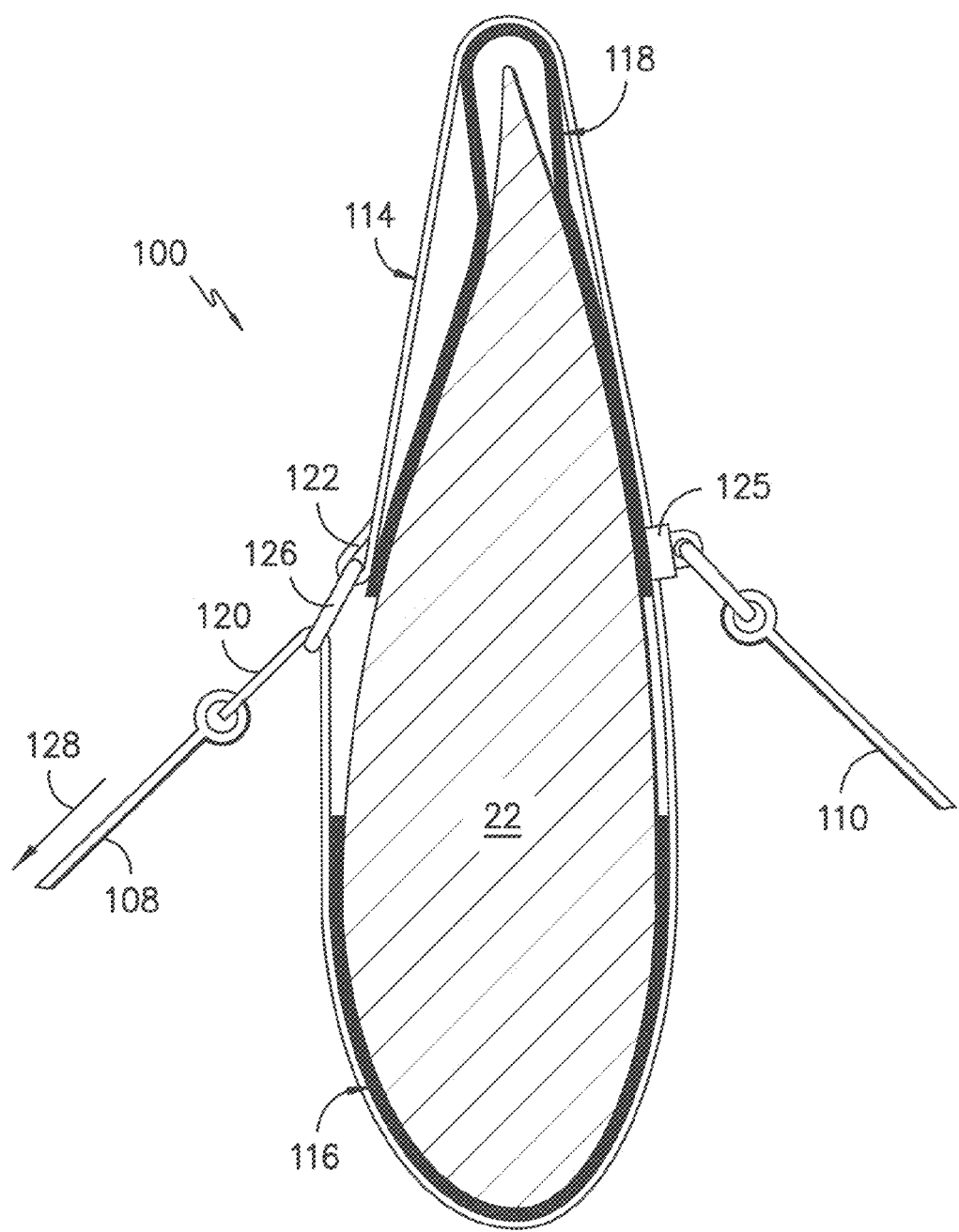
FIG. 7 illustrates a similar cross-sectional view to that shown in FIG. 5, particularly illustrating another embodiment of a blade sock in accordance with aspects of the present subject matter.

It should be appreciated that, in alternative embodiments, the sock strap 114 may have any other suitable configuration that allows it to be tightened around the rotor blade 22 using the sock cables 108, 110. For instance, instead of being looped around the rotor blade 22 in the partially overlapping manner shown in FIG. 5, the sock strap 114 may be configured similar to a choker-type lifting sling. An example of such a configuration is illustrated, for example, in FIG. 7. As shown in FIG. 7, the sock strap 114 may be configured to be looped around the rotor blade 22 once, with the first end 120 of the sock strap 114 being received through the mount ring 126 secured to the second end 122 of the strap 114. In such an embodiment, by coupling one of the sock cables (e.g., the first sock cable 108) to the first end 120 of the strap 114, the sock cable 108 may be used to apply a tightening force through the sock strap (as indicated by arrow 128) in order to tighten the sock strap 114 around the rotor blade 22.

Figure 8:
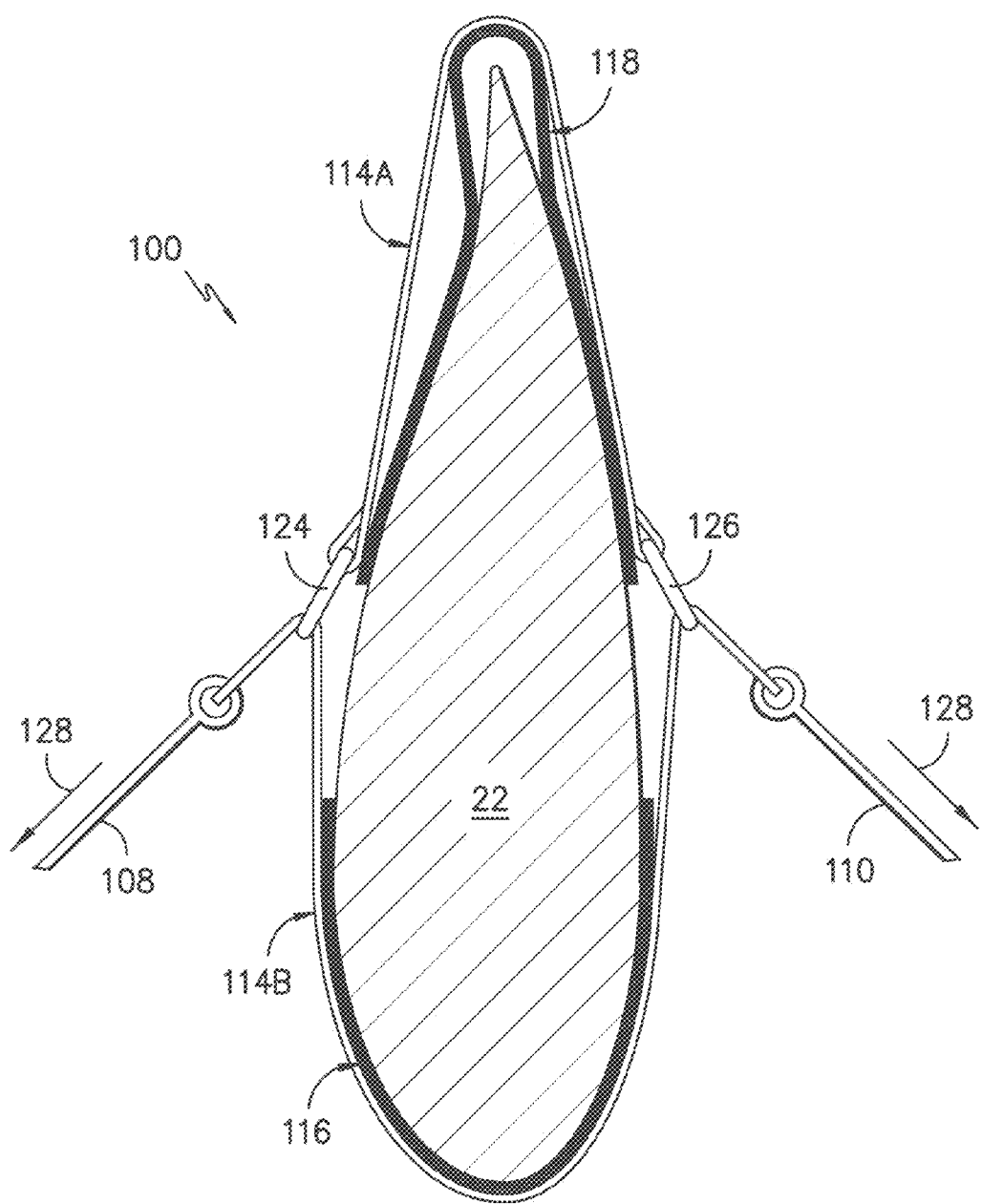
FIG. 8 illustrates a similar cross-sectional view to that shown in FIG. 5, particularly illustrating a further embodiment of a blade sock in accordance with aspects of the present subject matter.

Alternatively, FIG. 8 illustrates yet another example of a choker-type configuration that may be utilized to allow the sock strap 114 to be self-tightening. As shown, the sock strap is formed from two separate strap portions 114A, 114B. Specifically, the first strap portion 114A may be configured to extend partially around the outer perimeter of the rotor blade 22 between first and second mount rings 124, 126. In addition, the second strap portion 114B may be configured to extend around the remainder of the outer perimeter of the rotor blade 22. In such an embodiment, each end of the second strap portion 114B may be received through one of the mount rings 124, 126 of the first strap portion 114A and coupled to one of the sock cables 108, 110. Thus, each sock cable 108, 110 may be used to apply a tightening force (as indicated by arrows 128) through the first and second strap portions 114A, 114B that allows the sock strap to be tightened around the rotor blade 22.

It should be appreciated that the sock strap 114 (including strap portions 114A, 114B) may generally be formed from any suitable material(s) that allow the strap 114 to function as described herein. For instance, in several embodiments, the sock strap 114 may be formed from a relative strong and/or durable material, such as nylon, Kevlar or any other suitable material typically utilized to form lifting straps and/or slings.

Figure 9:
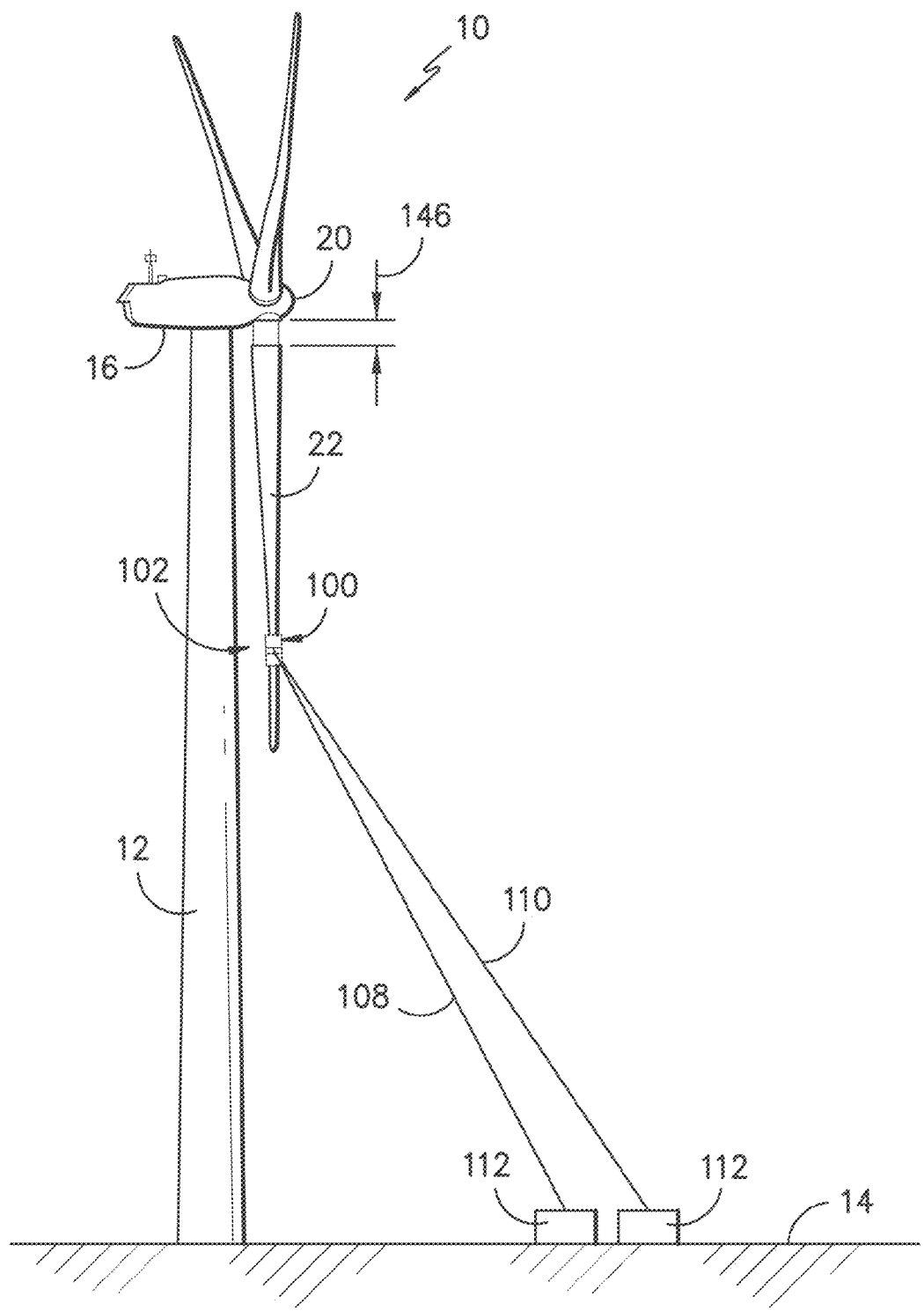
FIG. 9 illustrates another perspective view of the wind turbine shown in FIG. 3, particularly illustrating the rotor blade to be removed after it has been lowered from the hub by an initial vertical distance.

Referring now to FIG. 9, once the blade sock 100 is installed onto the rotor blade 22 at the intermediate location 102, the rotor blade 22 may be initially lowered from the hub 22. Specifically, as shown in FIG. 9, the rotor blade 22 may be lowered from the hub 20 by an initial vertical distance 146. As will be described below, such initial lowering of the rotor blade 22 may allow for one or more straps, cables or chains to be coupled between the blade 22 and another up-tower component of the wind turbine 10, thereby providing a means for further lowering the rotor blade 22. Thus, the initial vertical distance 146 may generally correspond to any suitable distance that allows for the installation of the straps, cables or chains and any associated harness. For example, in one embodiment, the initial vertical distance 146 may generally range from about 2 feet to about 15 feet, such as from about 3 feet to about 10 feet or from about 5 feet to about 10 feet and any other subranges therebetween.

Figure 10:
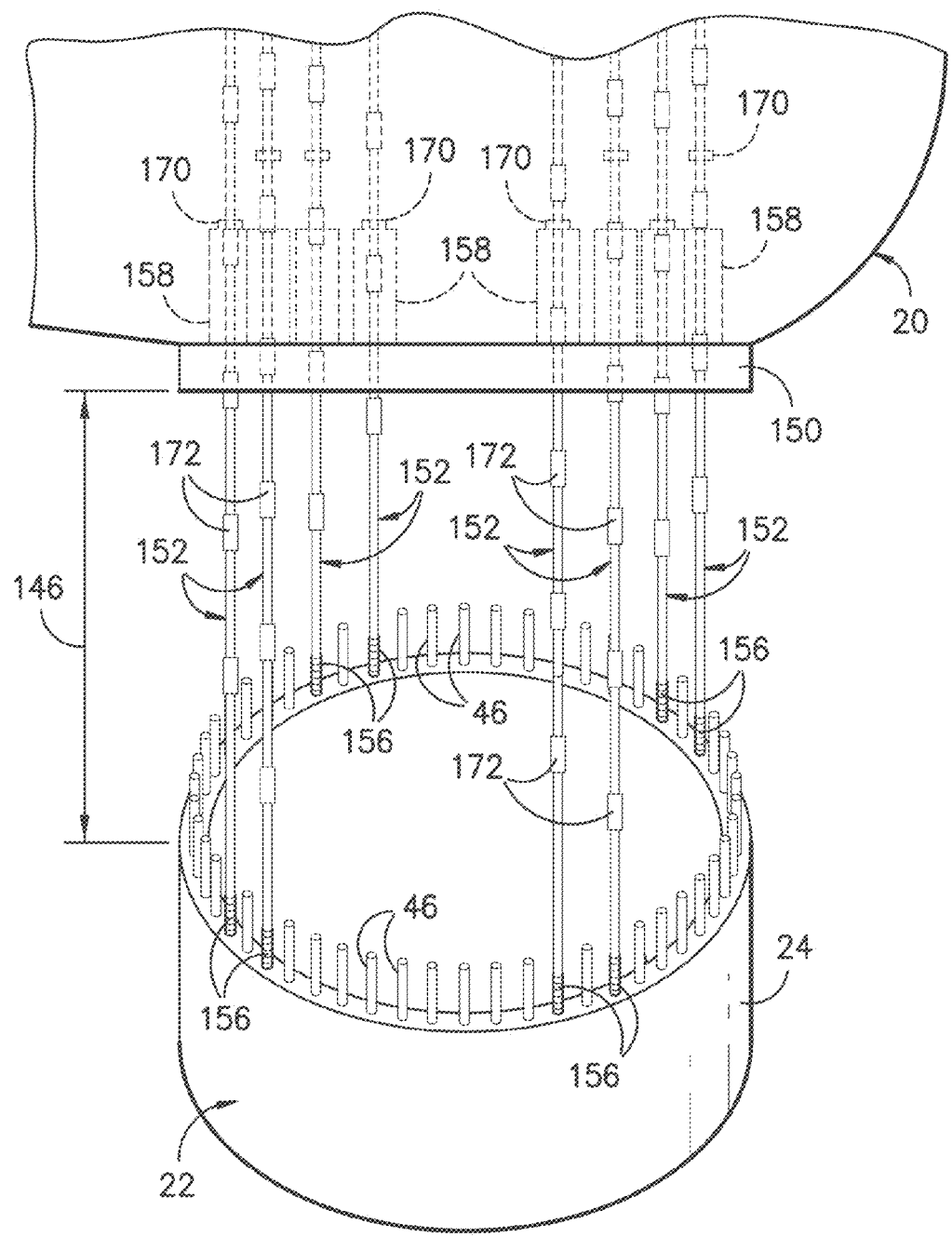
FIG. 10 illustrates a close-up, partial perspective view of the rotor blade and the hub shown in FIG. 9, particularly illustrating one embodiment of a lowering system including support cables secured to the rotor blade and extending through both a pitch bearing of the wind turbine and corresponding cable translation devices positioned within the hub.
Figure 11:
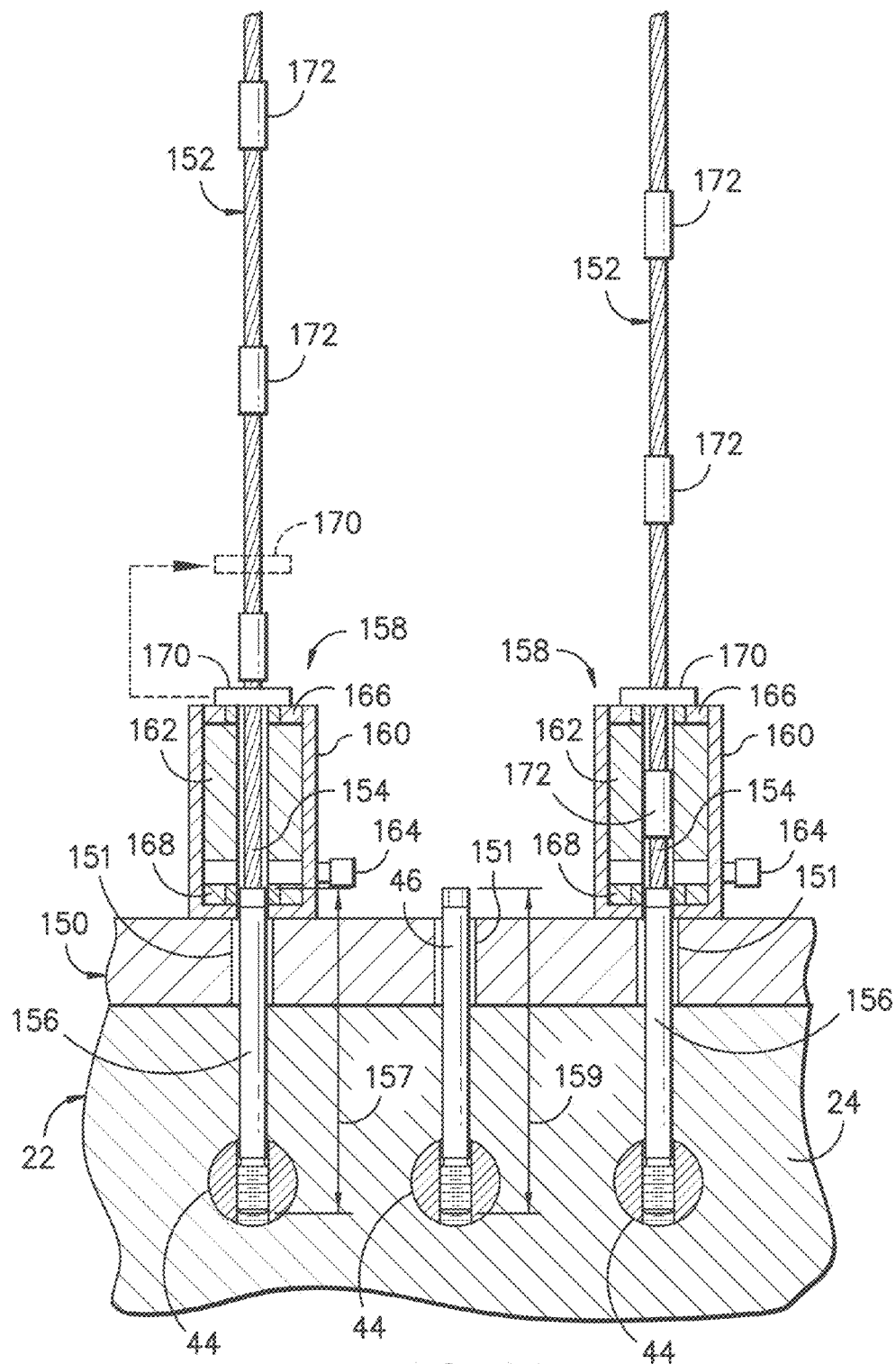
FIG. 11 illustrates a cross-sectional view of the rotor blade and the pitch bearing shown in FIG. 10 prior to the rotor blade being lowered from the hub, particularly illustrating a pair of the support cables and cable translation devices of the lowering system shown in FIG. 10.
Figure 12:
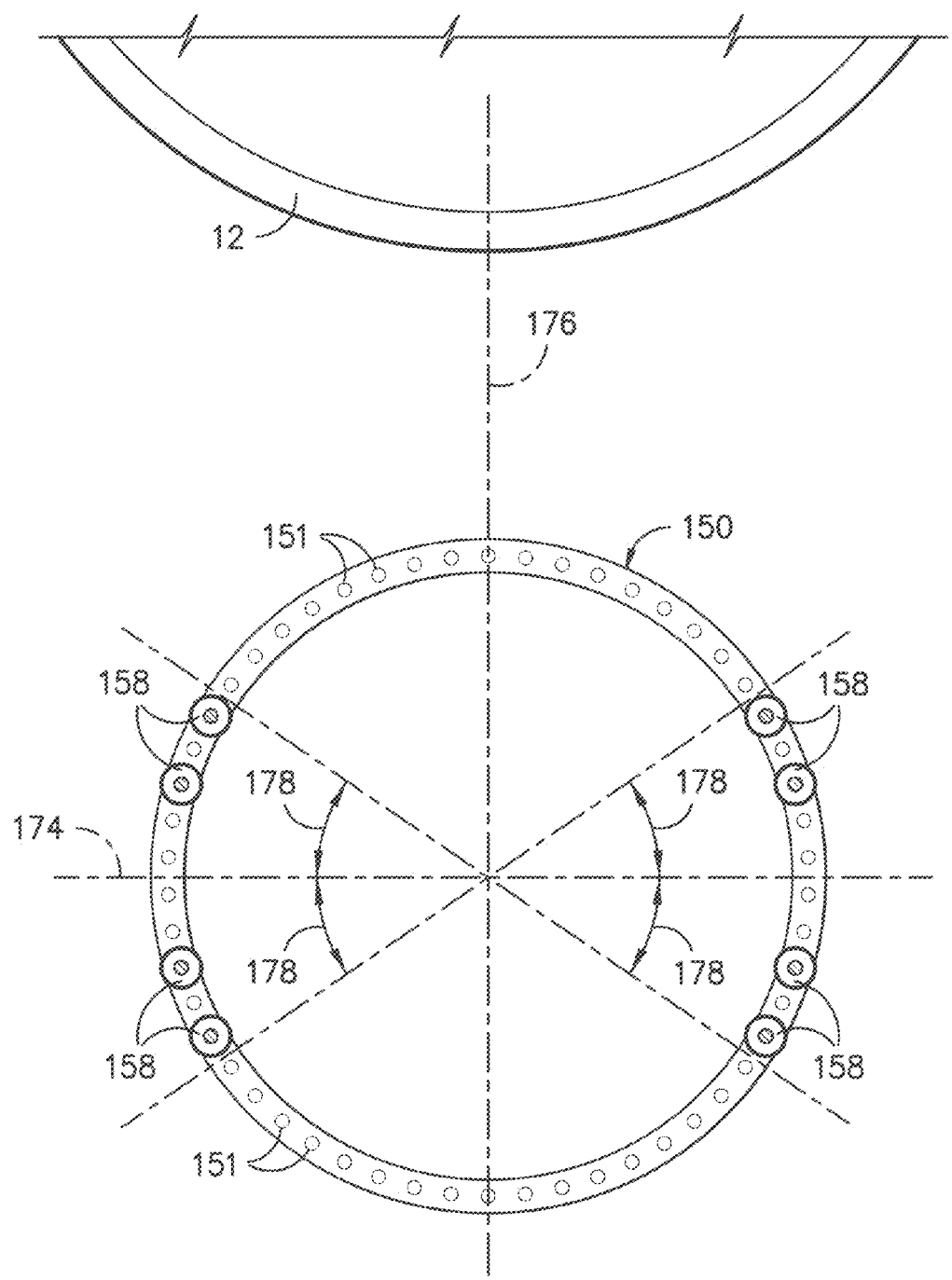
FIG. 12 illustrates a top-down view of the pitch bearing shown in FIGS. 10 and 11, particularly illustrating the circumferentially positioning of the cable translation devices around the pitch bearing relative to a tower reference line extending radially from the center of the wind turbine tower through the center of the pitch bearing.

Referring now to FIGS. 10-12, one embodiment of suitable components that may be included within a lowering system to initially lower the rotor blade 22 from the hub 20 is illustrated in accordance with aspects of the present subject matter. Specifically, FIG. 10 illustrates a partial perspective view of the hub 20, the rotor blade 22 and the pitch bearing 150 of the wind turbine 10 after the blade 22 has been lowered from the hub 20 by the initial vertical distance 146. FIG. 11 illustrates a partial, cross-sectional view of the interface between the rotor blade 22 and the pitch bearing 150 prior to the blade 22 being lowered relative to the hub 20. Additionally, FIG. 12 illustrates a top view of the pitch bearing 150 of the wind turbine 10, particularly illustrating the relative circumferential positioning of the system components utilized to initially lower the rotor blade 22 relative to the hub 20.

It should be appreciated that, for purposes of illustration, only the inner race of the pitch bearing 150 is shown in FIG. 12. As is generally understood, the pitch bearing 150 may also include an outer race configured to be coupled to the hub 20. As such, when the inner race is rotated relative to the outer race of the pitch bearing 150, the rotor blade 22 may be pitched about its pitch axis.

As particularly shown in FIG. 11, to allow the rotor blade 22 to be initially lowered, several of the root bolts 46 extending through the bolt holes 151 defined in the pitch bearing 150 may be removed and replaced with suitable support cables 152. For example, as shown in FIG. 10, in one embodiment, eight of the root bolts 46 may be removed and replaced with corresponding support cables 152. In doing so, the remainder of the root bolts 46 may be initially maintained in engagement with the pitch bearing 150 (e.g., via suitable attachment nuts (not shown)) to allow the rotor blade 22 to continue to be supported by the hub 20 until the rotor blade 22 is ready to be lowered.

In general, the support cables 152 may correspond to any suitable cables that are capable of supporting the weight of the rotor blade 22 as it is being lowered relative to the hub 20. For example, in several embodiments, each support cable 152 may correspond to a steel cable or any other suitable wire rope that has a rated load capacity sufficient to handle the weight of the rotor blade 22. In another embodiment, each support cable 152 may correspond to a metal chain or any other suitable elongated cable-like object. Moreover, it should be appreciated that each support cable 152 may generally be configured to define any suitable length that permits the cables to be utilized to lower the rotor blade 22 away from the hub 20 by the initial vertical distance 146.

In addition, the support cables 152 may generally be configured to be coupled to the rotor blade 22 using any suitable attachment means. For example, as shown in the illustrated embodiment, a stud end 154 of each cable 152 may be coupled to a threaded cable stud 156 configured to be screwed into one of the barrel nuts 44 extending within the blade root 24. In such an embodiment, a swaged or other suitable connection may be formed between the stud end 154 of each cable 152 and each cable stud 156 to securely couple to the cables 152 to the corresponding studs 156. In other embodiments, the support cables 152 may be coupled to the blade root 24 using any other suitable means, such as by coupling each support cable 152 to a suitable mounting fixture configured to be secured to the blade root 24.

It should be appreciated that, in embodiments in which the support cables 152 are coupled to the blade root 24 via the threaded cable studs 156, each cable stud 156 may generally be configured to define any suitable length 157. As shown in FIG. 11, in one embodiment, the length 157 of each cable stud 156 may be substantially equal to a corresponding length 159 of the root bolts 46.

As shown in FIGS. 10 and 11, each support cable 152 may be configured to be in operative association with a suitable cable translation device 158 positioned within the hub 20. In general, each cable translation device 158 may correspond to any suitable device that allows for the rotor blade 22 to be safely and securely moved relative to the hub 20 using the support cables 152. For example, in several embodiments, each cable translation device 152 may correspond to a fluid-driven actuator (e.g., a hydraulic or pneumatic actuator) configured to be in operative association with a corresponding support cable 152 to allow the rotor blade 22 to be lowered and/or raised relative to the hub 20.

Specifically, in a particular embodiment of the present subject matter, each cable translation device 158 may be configured as a hollow lifting/lowering cylinder or as a single strand jack designed to incrementally lower and/or raise the rotor blade 22. For example, as shown in FIG. 11, each device 158 may include a cylinder 160 configured to be coupled to the pitch bearing 150 (e.g., via suitable bolts and/or other mechanical fasteners (not shown)) and a hollow piston 162 configured to receive one of the support cables 152. The piston 162 may generally be configured to be actuated and retracted relative to the cylinder 160 by supplying/expelling a pressurized fluid to/from the cylinder 160 (e.g., via fluid port 164). In addition, each cable translation device 158 may include an upper clamping mechanism 166 positioned directly above the piston 162 and a lower clamping mechanism 168 positioned directly below the piston 162. As is generally understood, the upper and lower clamping mechanisms 166, 168 may be configured to alternatively clamp the support cable 152 as the piston 162 is actuated and retracted, thereby allowing each translation device 158 to lower or raise the rotor blade 22 in short increments with each actuation/retraction of the piston 162.

Additionally, in several embodiments, a stop block 170 may be configured to be installed around each support cable 152 directly above its corresponding cable translation device 158. In general, each stop block 170 may be configured to serve as a built-in safety feature providing a mechanical stop for each support cable 152 in the event of failure of one of the cable translation devices 158. For example, as particularly shown in FIG. 11, each support cable 152 may include a plurality of lugs 172 spaced apart incrementally along the cable's length. In such an embodiment, an opening or slot (not shown) may be defined through each stop block 170 that is dimensionally larger than the cable 152, thereby allowing the cable 152 to pass through the stop block 170 as it is being lowered relative to the translation device 158. However, given their increased size, the lugs 172 may not be capable of passing through the opening or slot defined in each stop block 170. Accordingly, in the event of failure of one of the cable translation devices 158, the lug 172 positioned immediately above the corresponding stop block 170 may come into contact with and engage an upper surface of the block 170, thereby preventing further motion of the support cable 152 relative to the translation device 158. In contrast, during normal operation, the stop blocks 170 may be continuously repositioned along the support cable 152 as each lug 172 is lowered down onto and/or adjacent to its corresponding stop block 170. For example, as indicated by the dashed lines in FIG. 11, when one of the lugs 172 is lowered down into and/or adjacent to one of the stop blocks 170, the stop block 170 may be removed from the support cable 152 and repositioned above such lug 172 to allow the support cable 152 to continue to be lowered through the translation device 158.

It should be appreciated that, in general, each support cable 152 and corresponding translation device 152 may be configured to be installed at any suitable location around the circumference of the blade root 24 and pitch bearing 150. However, in several embodiments, the cables/devices 152, 158 may be grouped in pairs spaced apart around the blade root 24 and pitch bearing 150. For example, as shown in FIG. 12, in one embodiment, each pair of the cable translation devices 158 may be configured to be positioned around the pitch bearing 150 at circumferential locations generally adjacent to a reference line 174 oriented perpendicularly to a tower reference line 176 extending radially from the center of the wind turbine's tower 12 through the center of the pitch bearing 150. Specifically, as shown, each pair of the cable translation devices 158 may generally be spaced apart circumferentially from the reference line 174 by an angle 178 equal to less than about 45 degrees, such as less than about 40 degrees or less than about 35 degrees. Of course, in such an embodiment, the support cables 152 may similarly be secured to the blade root 24 at corresponding circumferential location relative to the reference line 174. Such positioning of the cables/devices 152, 158 adjacent to the reference line 174 may, in certain rotor blade configurations, allow for the rotor blade 22 to be slightly angled away from the tower 12 as the blade 22 is being lowered relative to the hub 20 due to the location of the blade's center of gravity.

As indicated above, in one embodiment, eight support cables 152 and corresponding translation devices 158 may be installed to assist in lowering the rotor blade 22 relative to the hub 20. However, in other embodiments, any other suitable number of support cables 152 and translation devices 158 may be utilized to lower the rotor blade 22 relative to the hub 20. For instance, in one embodiment, the rotor blade 22 may be lowered using only four cables/devices 152, 158 or using only two cables/devices 152, 158.

Figure 13:
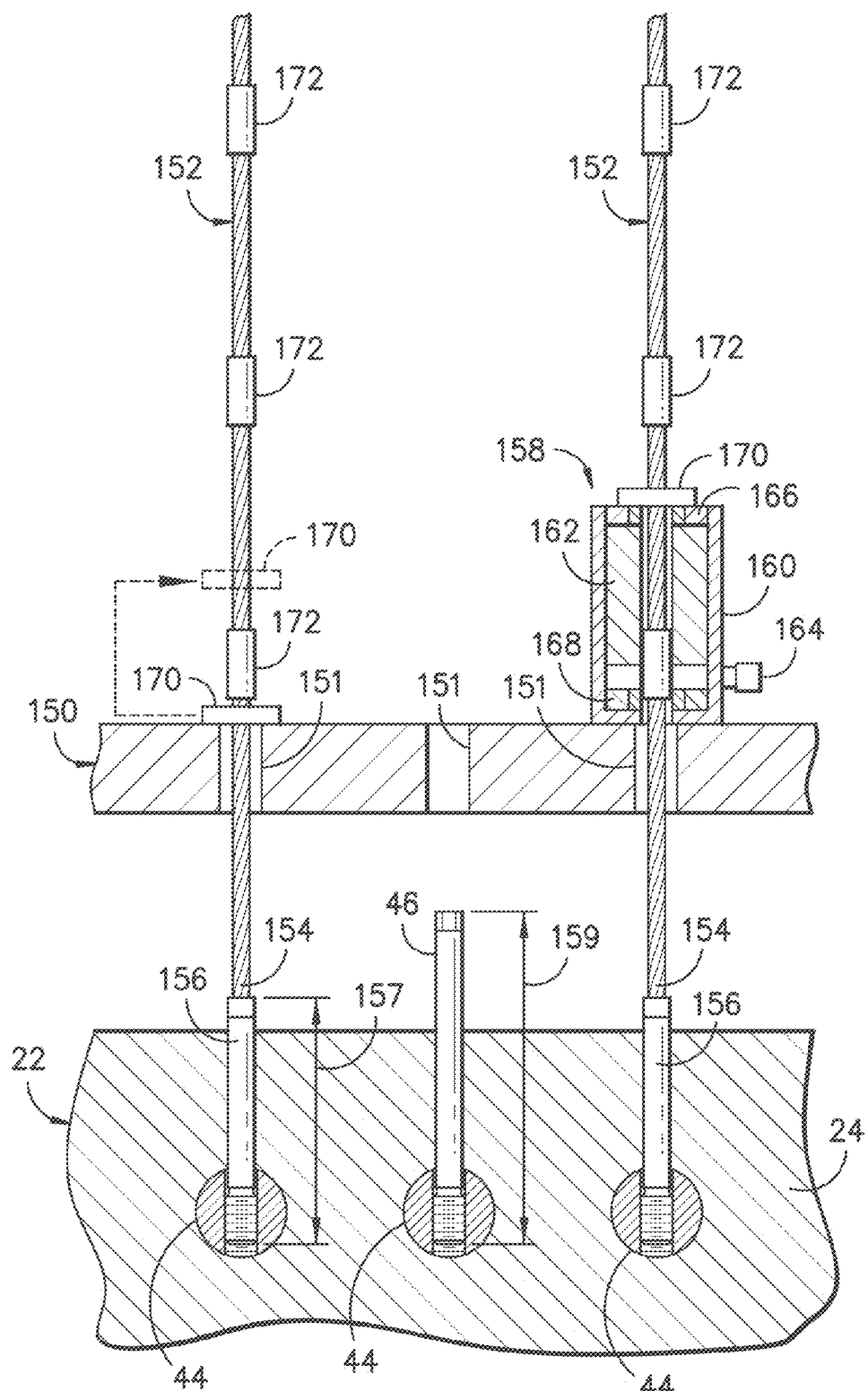
FIG. 13 illustrates a similar cross-sectional view to that shown in FIG. 11, particularly illustrating a variation of the blade lowering system shown in FIG. 11 in which each pair of support cables secured to the rotor blade includes one support cable in operative association with a corresponding cable transition device and another support cable extending through the pitch bearing without being received within a cable translation device.

Additionally, in other embodiments, only a portion of the support cables 152 coupled to the rotor blade 22 may be configured to be in operative associated with corresponding cable translation devices 158. For instance, FIG. 13 illustrates an alternative embodiment to the embodiment shown in FIG. 11. As shown in FIG. 13, for each pair of support cables 152 extending from the blade root 24, one of the cables 152 may be configured to be in operative association with a corresponding translation device 158 positioned within the hub 20. In such an embodiment, each support cable 152 not associated with a translation device 158 may simply be used to provide additional support for the rotor blade 22 as it is being lowered. In addition, such support cables 152 may also be configured to be utilized in connection with the stop blocks 170 described above. For instance, as shown in FIG. 13, the stop block 170 may be positioned directly above the pitch bearing 150 to allow the stop block 170 to be engaged between one of the cable lugs 172 and the pitch bearing 150 in the event of failure of one or more of the translation devices 158 installed on any of the other support cables 152.

It should be appreciated that, in further embodiments of the present subject matter, the rotor blade 22 may be configured to be initially lowered from the hub 20 using any other suitable lowering means known in the art. For instance, as an alternative to the fluid-driven cable translation devices 158 described above, the cable translation devices may correspond to winches positioned within the hub 20. In such an embodiment, the support cables (or chains) 152 may be unwound from each associated winch in order to initially lower the rotor blade 22 from the hub 20. In another embodiment, the support cables 152 may be replaced with elongated threaded rods. In such an embodiment, the threaded rods may be received within a suitable translation device (e.g., a screw jack) configured to allow the rods to be moved relative to the device, thereby allowing the rotor blade 22 to be lowered relative to the hub 20.

Figure 14:
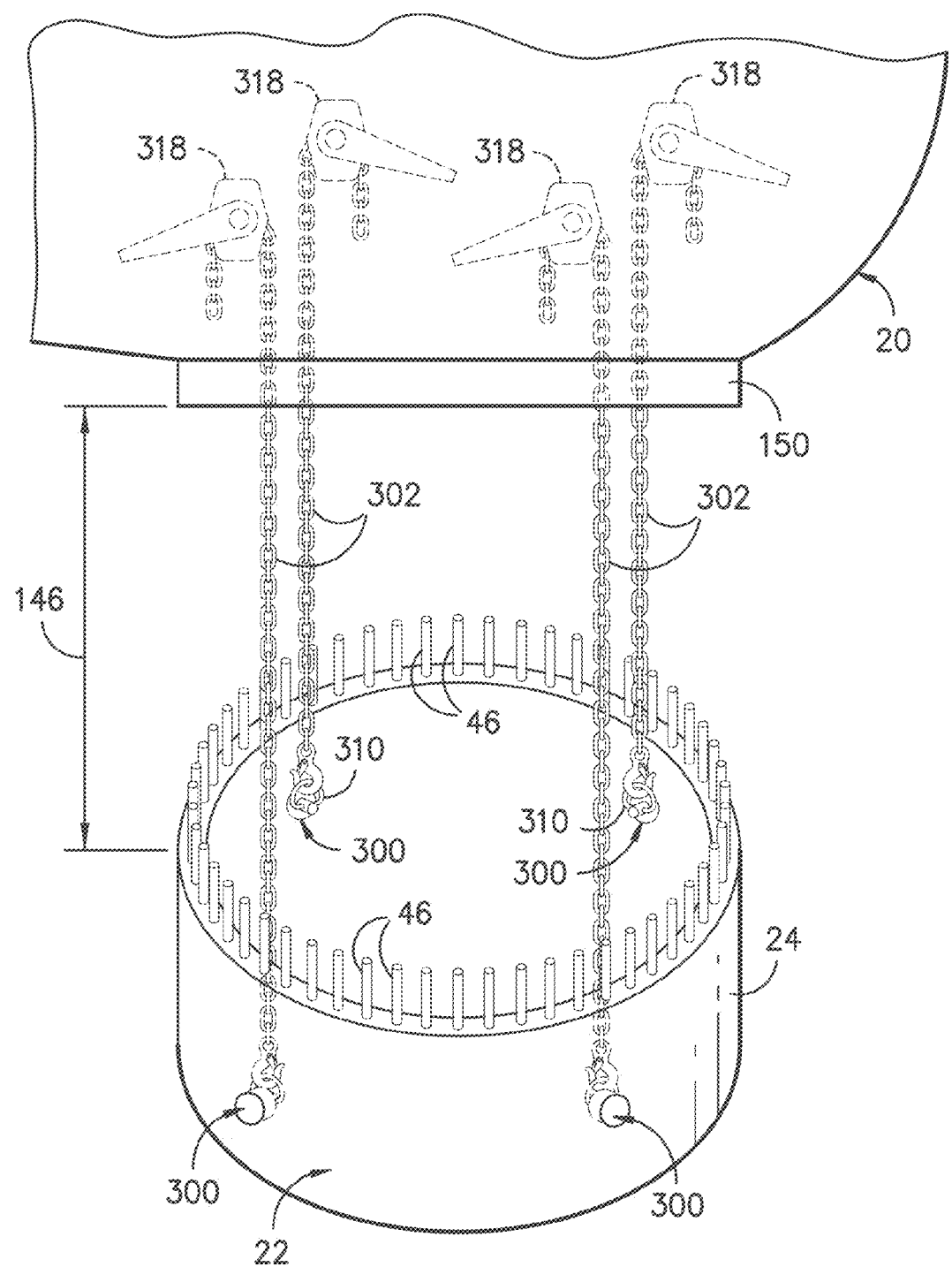
FIG. 14 is a close-up, partial perspective view of the rotor blade and the hub shown in FIG. 9, particularly illustrating another embodiment of a lowering system including support cables secured to the rotor blade and corresponding cable translation devices positioned within the hub.
Figure 15:
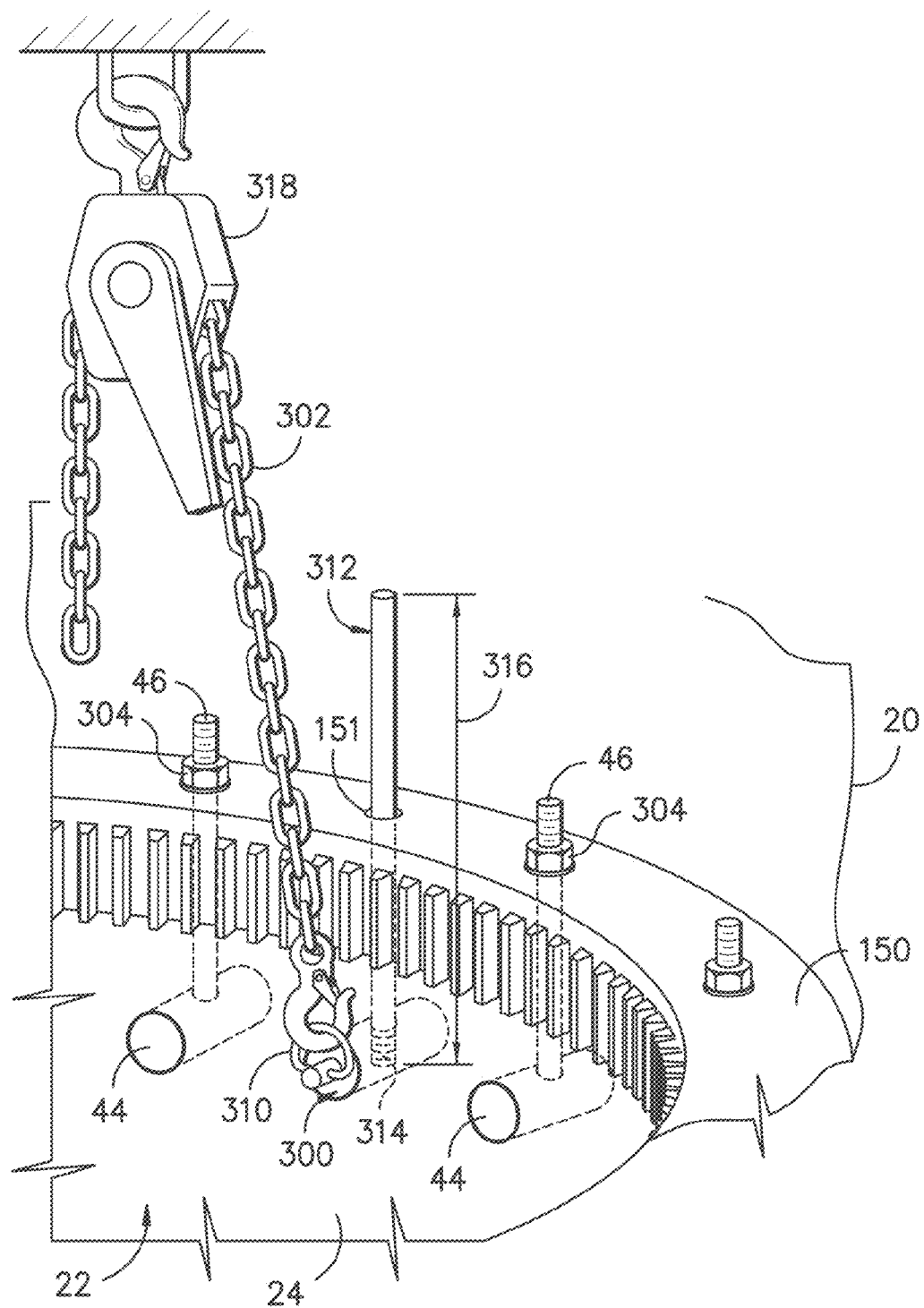
FIG. 15 illustrates a close-up, partial perspective view of the interface between the rotor blade and the pitch bearing shown in FIG. 14 prior to the rotor blade being lowered from the hub, particularly illustrating a support cable coupled between a support nut installed within the blade root and a corresponding cable translation device positioned within the hub.
Figure 16:
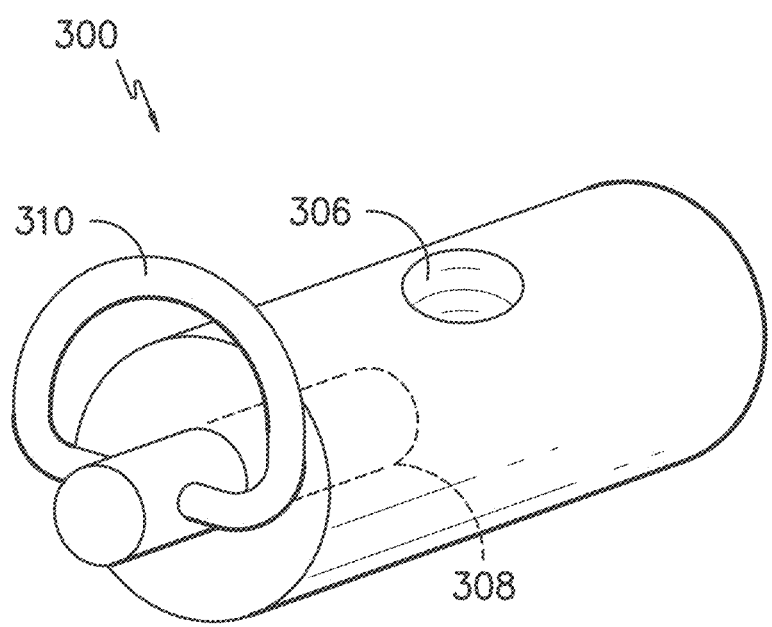
FIG. 16 illustrates a perspective view of the support nut shown in FIG. 15.

Referring now to FIGS. 14-16, another embodiment of suitable components that may be included within a lowering system to initially lower the rotor blade 22 from the hub 20 is illustrated in accordance with aspects of the present subject matter. Specifically, FIG. 14 illustrates a partial perspective view of the hub 20, the rotor blade 22 and the pitch bearing 150 of the wind turbine 10 after the blade 22 has been lowered from the hub 20 by the initial vertical distance 146. FIG. 15 illustrates a partial, perspective view of the interior of the hub 20 at the interface between the rotor blade 22 and the pitch bearing 150 prior to the blade 22 being lowered relative to the hub 20. Additionally, FIG. 16 illustrates a perspective view of one embodiment of a modified barrel-type support nut 300 configured for use in the illustrated lowered system in accordance with aspects of the present subject matter.

As particularly shown in FIGS. 14 and 15, to allow the rotor blade 22 to be initially lowered, several of the root bolts 46 extending through the bolt holes 151 defined in the pitch bearing 150 may be removed. The existing barrel nuts 44 associated with such bolts 46 may then be replaced with cylindrically-shaped support nuts 300, with each support nut 300 being configured to allow a corresponding support cable 302 to be coupled to the blade root 24. For example, as shown in FIG. 14, in one embodiment, four of the existing barrel nuts 44 may be removed and replaced with suitable support nuts 300. In doing so, the remainder of the root bolts 46 may be initially maintained in engagement with the pitch bearing 150 (e.g., via suitable attachment nuts 304 to allow the rotor blade 22 to continue to be supported by the hub 20 until the rotor blade 22 is ready to be lowered.

It should be appreciated that the support nuts 300 may generally have any suitable configuration that allows each support nut 300 to be inserted through the blade root 24 in place of one of the existing barrel nuts 44 as well as to provide a means for coupling each support cable 302 to the rotor blade 22. For example, in one embodiment, each support nut 300 may be configured as a modified barrel nut. For instance, as shown in FIG. 16, each support nut 300 may include a threaded opening 306 extending vertically through the support nut 300 to allow a corresponding root bolt 46 or other suitable threaded member to be coupled to the nut 300 and extend vertically therefrom. In addition, each support nut 300 may include a laterally extending threaded opening 308 defined through one of the sides of the nut 300. The opening 308 may allow for a suitable coupling device 310 (e.g., a swivel eye, mount ring, mount hook or any other suitable attachment mechanism) to be secured to the support nut 300 for coupling each support cable 302 to the rotor blade 22.

As indicated above, in one embodiment, four support nuts 300 may be installed through the blade root 24 in place of the existing barrel nuts 44 to allow four corresponding support cables 302 to be coupled to the rotor blade 22. However, in other embodiments, any other suitable number of support nuts 300 may be secured within the blade root 24 to provide a means for coupling a corresponding number of support cables 302 to the rotor blade 22, such as by installing less than four support nuts 300 within the blade root 24 (e.g., two or three support nuts) or greater than four support nuts 300 within the blade root 24 (e.g., five, six or more support nuts).

Additionally, it should be appreciated that the support nuts 300 may be configured to be maintained in position relative to the rotor blade 22 using any suitable attachment means. For instance, in one embodiment, once a given support nut 300 is inserted within the blade root 24, a corresponding root bolt 46 may be inserted through the pitch bearing 150 and screwed into the vertically extending opening 306 of the support nut 300 in order to secure the nut 300 within the blade root 24. Alternatively, as shown in FIG. 15, an alignment pin 312 may be configured to be inserted through the pitch bearing 150 and screwed into the vertically extending opening 306 of each support nut 300. In such an embodiment, each alignment pin 312 may generally be configured for attachment within the corresponding support nut 300 in a manner similar to the existing root bolts 46 and, thus, may include a threaded end 314 for engaging the threaded opening 306 of the support nut 300. Each alignment pin 312 may define a vertical height or length 316 that is greater than the length 159 of the root bolts 46. Accordingly, the alignment pins 312 may also be utilized to align the rotor blade with pitch bearing as the rotor blade (or a different rotor blade with the alignment pins installed therein) is being lifted up onto the hub.

In a further embodiment, the support nuts 300 may be secured within the blade root 24 using the threaded cable studs 156 of the support cables 152 described above with reference to FIGS. 10-13. In such an embodiment, the support cables 152 may be utilized as additional safety features for the system as the rotor blade 22 is being lowered relative to the hub 20. For example, as described above with reference to FIG. 13, the disclosed stop blocks 170 may be utilized without the cable translation devices 158 to allow each block 170 to serve as a mechanical stop between the pitch bearing 150 and the adjacent lugs 172 of the support cables 152 as the rotor blade 22 is being lowered.

It should also be appreciated that each support nut 300 may generally be configured to be installed within the rotor blade 22 at any suitable circumferential location around the blade root 24. However, in several embodiments, the support nuts 300 may be configured to be installed at the same or similar locations to the circumferential locations for the cables/devices 152/158 described above with reference to FIG. 12. For instance, in one embodiment, the support nuts 300 may be configured to be installed within the blade root 24 at circumferential locations spaced apart from the reference line 174 by a given angle 178 (FIG. 12), wherein the angle is generally equal to less than about 45 degrees.

Each support cable 302 may be configured to extend from one of the support nuts 300 to a corresponding cable translation device 318 positioned within the hub 20. As shown in FIG. 15, in one embodiment, the cable translation device 318 may correspond to cable hoists (including chain hoists) configured to be mounted to and/or supported by any suitable wind turbine component(s) positioned within the hub 20 (e.g., the hub gusset(s), joist(s) and/or any other suitable component(s)). As is generally understood, cable hoists may be configured to allow suitable cables to be passed therethrough in a controlled manner. Thus, in the present application, such cable hoists may be utilized to safely and effectively lower the rotor blade 22 relative to the hub 20.

It should be appreciated that, in alternative embodiments, the cable translation devices 318 may correspond to any other suitable devices and/or mechanisms that allow for the rotor blade 22 to be lowered relative to the hub 20 via the corresponding support cables 302. For instance, in another embodiment, the cable translation devices 318 may correspond to winches positioned within the hub 20.

It should also be appreciated that, similar to the support cables 152 described above, each support cable 302 may generally correspond to any suitable elongated cable-like object that has a rated load capacity sufficient to handle the weight of the rotor blade 22. For instance, as shown in the illustrated embodiment, the support cables 302 are configured as metal chains. However, in other embodiments, the support cables 302 may correspond to steel cables or any other suitable wire ropes. Moreover, it should be appreciated that each support cable 302 may generally be configured to define any suitable length that permits the cables 302 to be utilized to lower the rotor blade 22 away from the hub 20 by the initial vertical distance 146. The support cables 302 may also be connected to blade 22 by cutting a hole into the blade root 24 to install an attachment to the root bolts 46.

Figure 17:
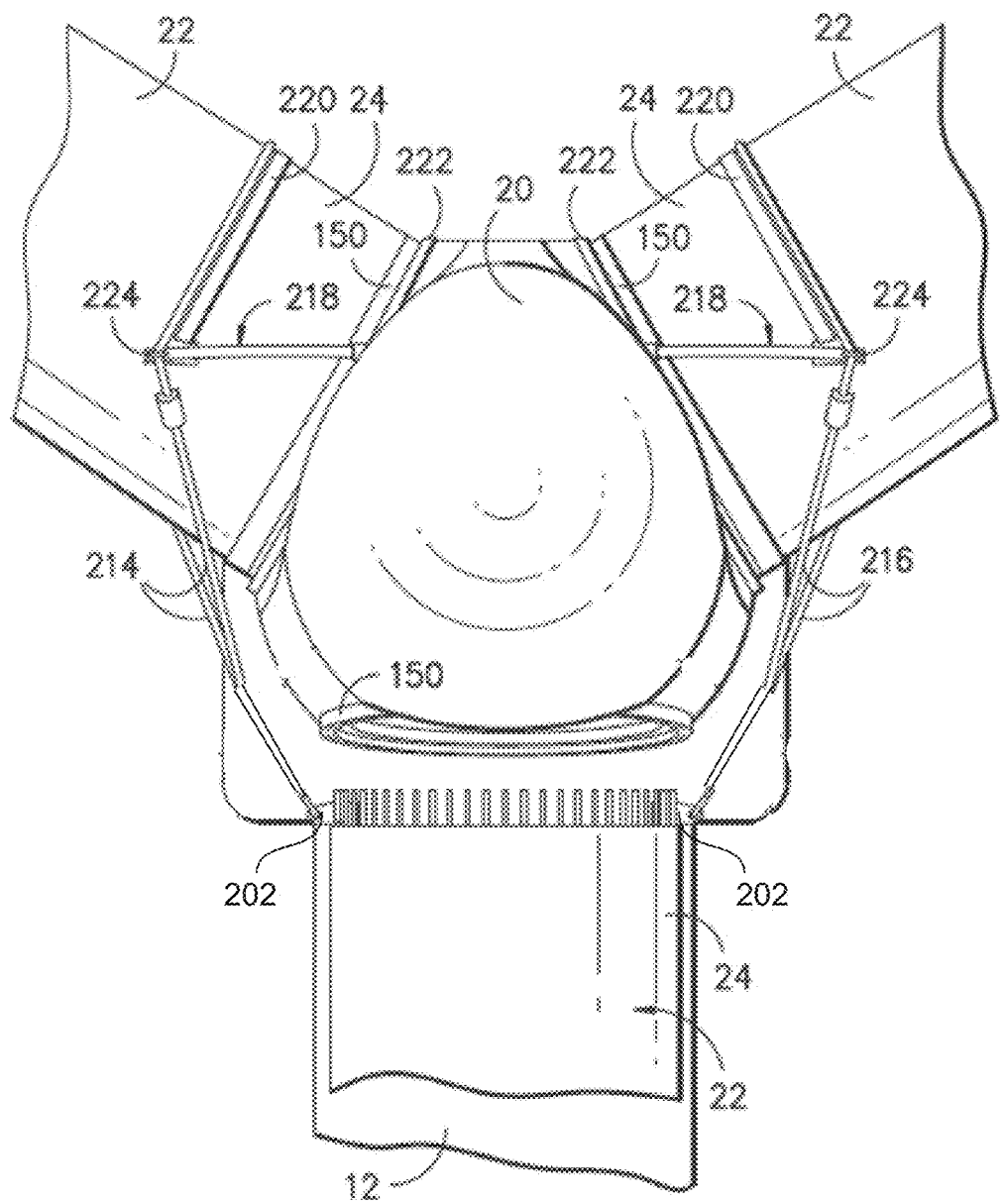
FIG. 17 illustrates an even further example of a rotor blade sling that may be utilized to support the rotor blade relative to the hub in accordance with aspects of the present subject matter.

Referring now to FIG. 17, a harness arrangement is illustrated in accordance with aspects of the present subject matter. First and second support straps 214, 216 are supported by a first strap 220, second strap 222 and bars 218 that extend around the remaining "rabbit-eared" rotor blades 22. In such an embodiment, first and second support straps 214, 216 may be configured to be coupled to the rotor blade 22 via mounting blocks 202. Additionally, a rigid structure may also be installed onto and/or around the remaining rotor blades 22 to provide additional support for the support straps 214, 216 and/or to maintain the spacing defined between the straps 214, 216 and the hub 20. For example, as shown in FIG. 17, a pair of rigid bars 218 (one bar from each pair being shown) may be supported adjacent to the blade root 24 of each remaining rotor blade 22 using first and second straps 220, 222 configured to extend over and around portions of the blade root 24, the pitch bearing 150 and/or the hub 20. In such an embodiment, a suitable coupling device 224 (e.g., a mounting ring or eyelet) may be positioned or formed at the outboard end of each rigid bar 218 for receiving the adjacent support strap 214, 216. The straps 220, 222, bars 218 and support straps 216, 218 may be referred to as a rotor blade sling or rotor blade harness. The rotor blade sling is coupled to the rotor blade 22 and then the translation devices 318 may be operated to further lower the rotor blade 22 by a little more so that the rotor blade sling at least partially, if not fully, supports the rotor blade 22. At this point, the support cables 302 can be removed and the rotor blade sling will fully support the rotor blade 22.

Figure 18:
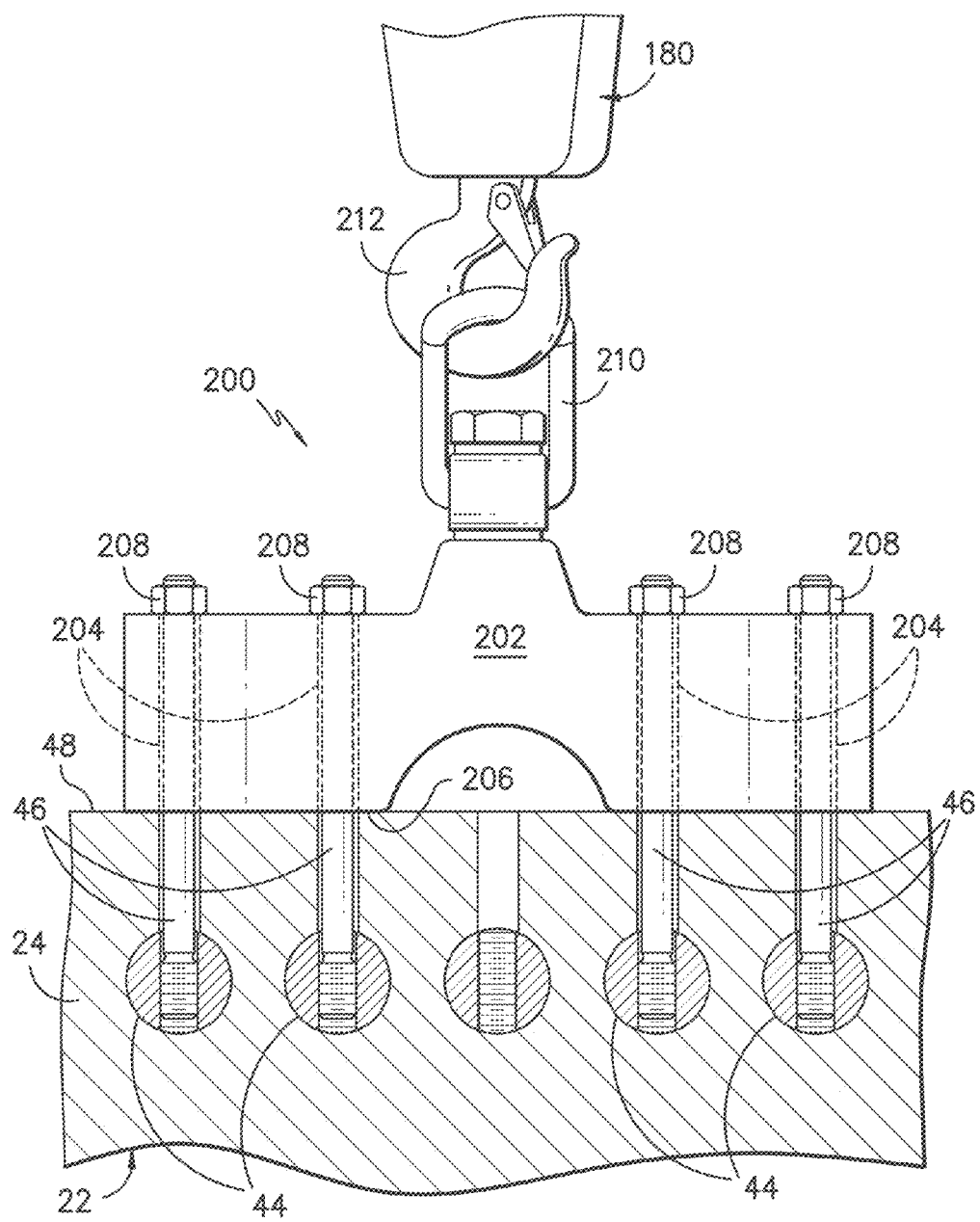
FIG. 18 illustrates an example view of one embodiment of a suitable fixture that may be utilized to couple a rotor blade sling to the blade root of a rotor blade in accordance with aspects of the present subject matter.

FIG. 18 illustrates a side view of one embodiment of a suitable mounting fixture 200 for coupling the support straps 214, 216 to the blade root 24 of rotor blade 22. As shown, the fixture 200 may include a mount block 202 defining a plurality of bolt holes 204 (e.g., two along each side of the fixture 200) configured to receive the root bolts 46. Thus, when the fixture 200 is installed onto the rotor blade 22 such that a bottom surface 206 of the fixture 200 is contacting the root end 48 of the blade 22, a corresponding number of root bolts 46 may extend through the bolt holes 204 to allow the fixture 200 to be coupled to the rotor blade 22 (e.g., via suitable attachment nuts 208). Support straps 214, 216 may include hooks 212 that engage a loop 210 connected to mount block 202.

Figure 19:
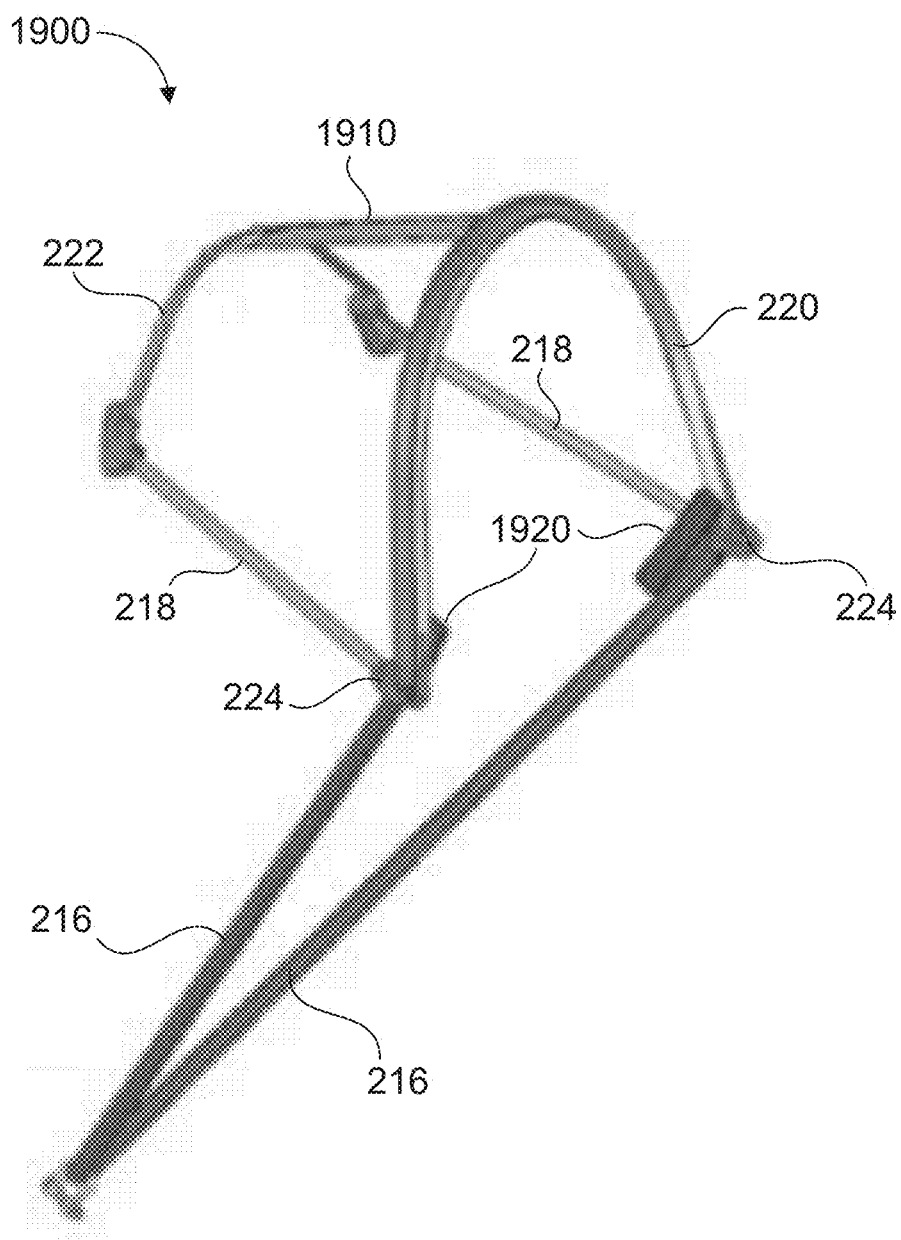
FIG. 19 illustrates a perspective view of a rotor blade sling that may be utilized to support the rotor blade relative to the hub in accordance with aspects of the present subject matter.

FIG. 19 illustrates a perspective view of the rotor blade sling 1900, according to an aspect of the present invention. The rotor blade sling 1900 is configured to be positioned on the rotor and slip over one of the "rabbit-eared" rotor blades (e.g., at 10 o'clock and 2 o'clock). The support straps 216 hang down to connect to and support the 6 o'clock rotor blade. A top strap 1910 may be connected to the first strap 220 and second strap 222. The bars 218 provide support to the rotor blade sling. The support straps 216 are removably connected to the coupling devices 224. If desired, the rotor blade sling may also include cushions 1920 to protect the rabbit-eared rotor blades during use of the rotor blade sling.

Figure 20:
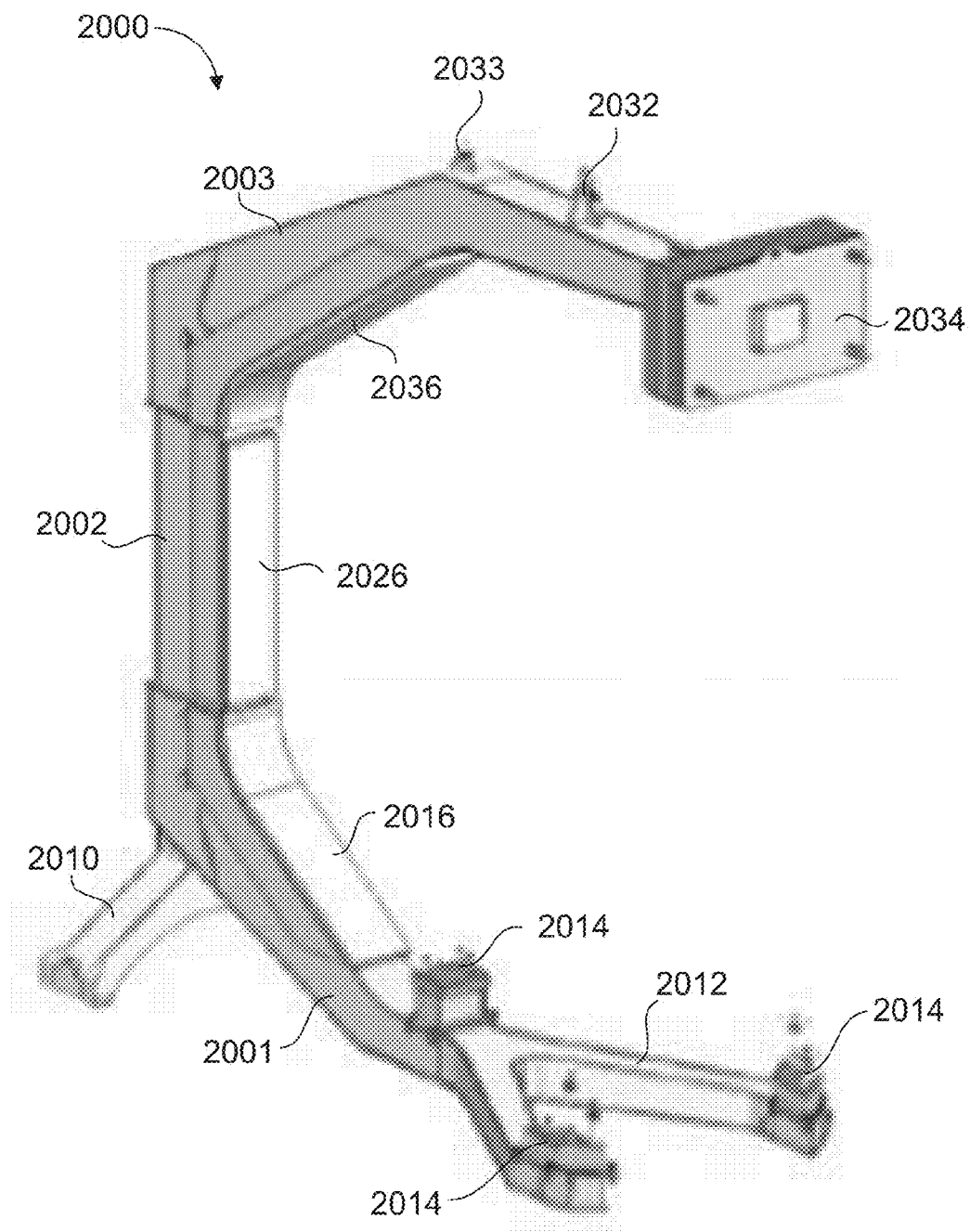
FIG. 20 illustrates a perspective view of a rotor servicing fixture that may be used to transport a rotor part to or from the rotor or hub in accordance with aspects of the present subject matter.

FIG. 20 illustrates a perspective view of a rotor servicing fixture 2000, according to an aspect of the present invention. The rotor servicing fixture 2000 is configured to be inserted between the rotor blade and the hub, and is also configured to transport a rotor part to or from the rotor via a crane. The crane can be a crane that does not have the capacity to lift the entire rotor 18 or rotor blade 22, and this is one of the advantages because smaller cranes are much more widely available and are also less expensive than larger cranes which could support the entire rotor 18. The rotor part to be transported may be a pitch bearing, stiffening ring, pitch motor, battery box, control box, or any other item that may be used in the hub 20 or rotor 18.

The rotor servicing fixture 2000 may be generally C-shaped so that it can fit around the hub 20, and includes three sections, a lower section 2001, a middle section 2002 and a top section 2003, each of which are configured to attach to form the C-shaped rotor servicing fixture 2000. The lower section 2001 includes one or more legs 2010 that are configured to maintain the rotor servicing fixture 2000 in an upright position when the rotor servicing fixture is resting on the ground. The legs 2010 may be configured in an inverted "Y" shape (as shown), an inverted "T" shape, or any suitable shape that adds stability to the rotor servicing fixture 2000. A rotor part mounting area 2012 is generally Y-shaped and includes a plurality of part mounting pads 2014. If the rotor part is a pitch bearing, then the pitch bearing can be arranged to rest on these mounting pads 2014, and the mounting pads may have extending pins or straps to aid in securing the pitch bearing to the rotor part mounting area. This rotor part mounting area 2012 may be used to transport new or replacement rotor parts to the rotor. The rotor part mounting area 2012 may also comprise a substantially flat and solid mounting pad (not shown) for transporting smaller items to or from the rotor. The lower section 2001 may also include a padded member 2016 on a hub facing portion of the lower section, and the padded member 2016 is configured to protect the hub during use of the rotor servicing fixture 2000. For example, the padded member may be comprised of rubber or foam, or any other resilient material that will absorb and cushion impacts between the rotor servicing fixture 2000 and hub 20.

The middle section 2002 consists primarily of a straight section that fits into both the lower section 2001 and the top section 2003. The sections may be bolted together by any suitable mechanical fasteners. The middle section 2002 may also include a padded member 2026 on a hub facing portion of the middle section, and the padded member 2026 is configured to protect the hub during use of the rotor servicing fixture 2000. For example and as above, the padded member may be comprised of rubber or foam, or any other resilient material that will absorb and cushion impacts between the rotor servicing fixture 2000 and hub 20.

The top section 2003 includes a crane attachment point 2032 and/or 2033 located above the rotor part mounting area 2012. The crane attachment point may be located so that the rotor servicing fixture maintains a relatively level orientation during use, as this will help to avoid undesired impacts between the rotor servicing fixture 2000 and parts of the rotor 18. To further fine tune the balance of the rotor servicing fixture 2000, a counterweight 2034 may be located and attached near the end of the top section. The weights of the counterweight 2034 are easily replaced or added to fine tune the balance of the rotor servicing fixture 2000. As above, the top section may include a padded member 2036 that is configured to protect the hub during use of the rotor servicing fixture, and the padded member may be comprised of rubber or foam, or any other resilient material that will absorb and cushion impacts between the rotor servicing fixture 2000 and hub 20. The rotor servicing fixture could also be a cantilevered or balanced support device, as opposed to a generally C-shaped member.

Figure 21:
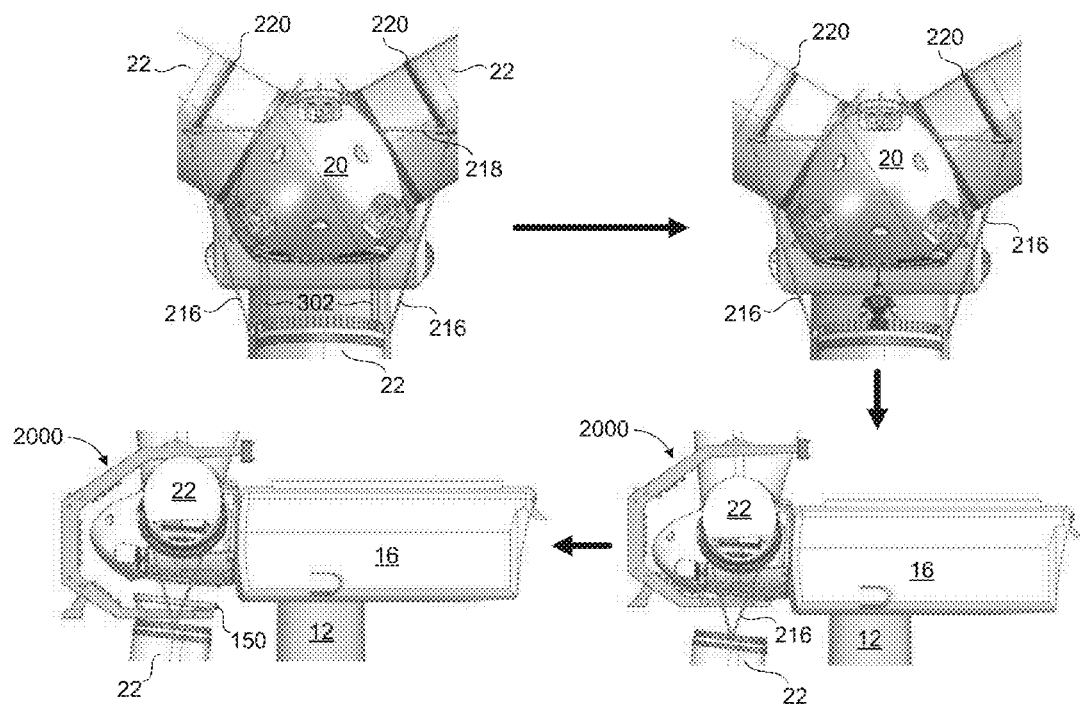
FIG. 21 illustrates sequential steps of a method for servicing a rotor utilizing the rotor blade sling and rotor servicing fixture, in accordance with aspects of the present subject matter.

FIG. 21 illustrates sequential steps of a method for servicing a rotor, according to an aspect of the present invention. In the upper left, the rotor blade 22 has been lowered by support cables 302 (see FIG. 14). The support straps 216 of the rotor blade sling 1900 have also been attached to the rotor blade 22. The upper right illustrates that the support cables 302 have been removed and the entire weight of the rotor blade 22 is supported by the rotor blade sling 1900. In this example, the 6 o'clock rotor blade is lowered about 6 to 10 feet below the pitch bearing 150 or hub 20. The lower right portion illustrates a side view showing the rotor servicing fixture placed between the 6 o'clock rotor blade and the hub 20. At this point, the rotor part may be removed from the hub 20 and lowered onto the rotor servicing fixture 2000. The lower left illustrates the rotor part (e.g., pitch bearing 150) mounted on the rotor servicing fixture 2000 and the rotor servicing fixture may now be lowered down to the ground by a crane (not shown for clarity).

Figure 22:
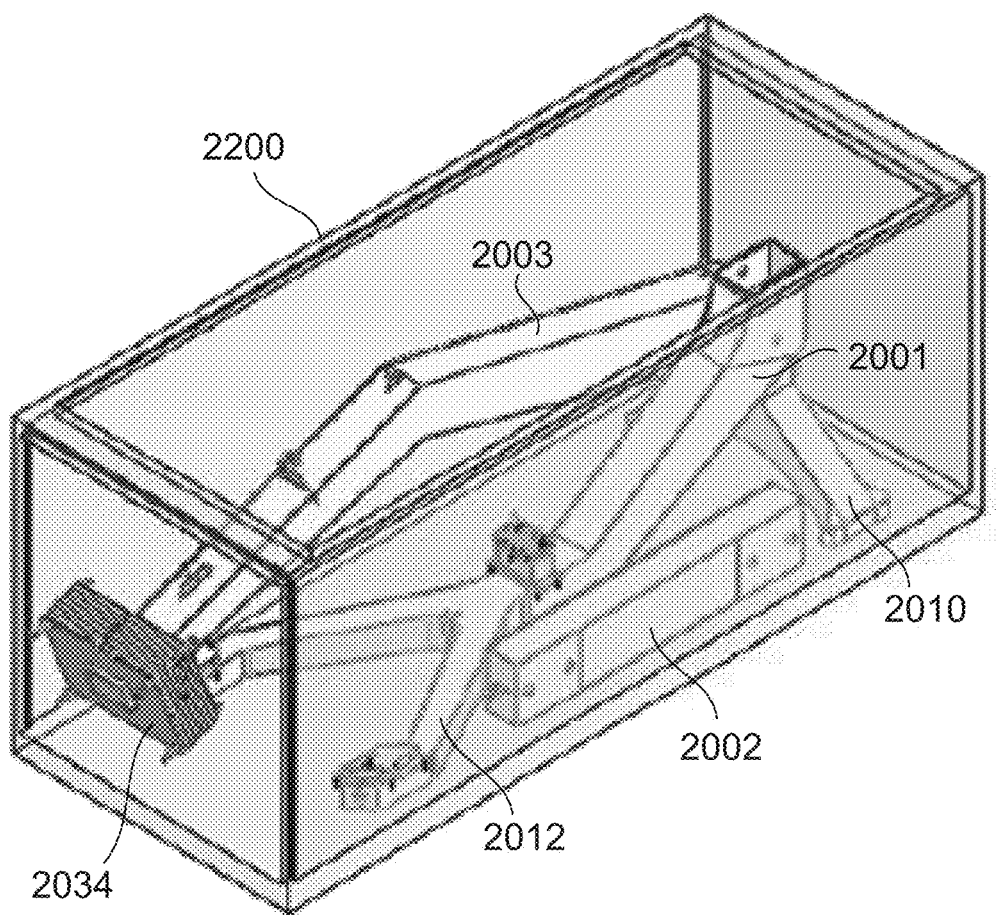
FIG. 22 illustrates a perspective view of the rotor servicing fixture partially disassembled and housed within a standard size shipping container, in accordance with aspects of the present subject matter.

FIG. 22 illustrates a perspective view of the rotor servicing fixture 2000 partially disassembled and housed within a standard size shipping container 2200, according to an aspect of the present invention. The rotor servicing fixture 2000 is configured to be modular so that it may be easily assembled or disassembled in the field, and further it may also fit within a standard size shipping container 2200 for ease of transport. One non-limiting example of a standard size shipping container is a container having a length of about 40 feet, a height of about 8 to 9 feet and a width of about 8 feet.

Figure 23:
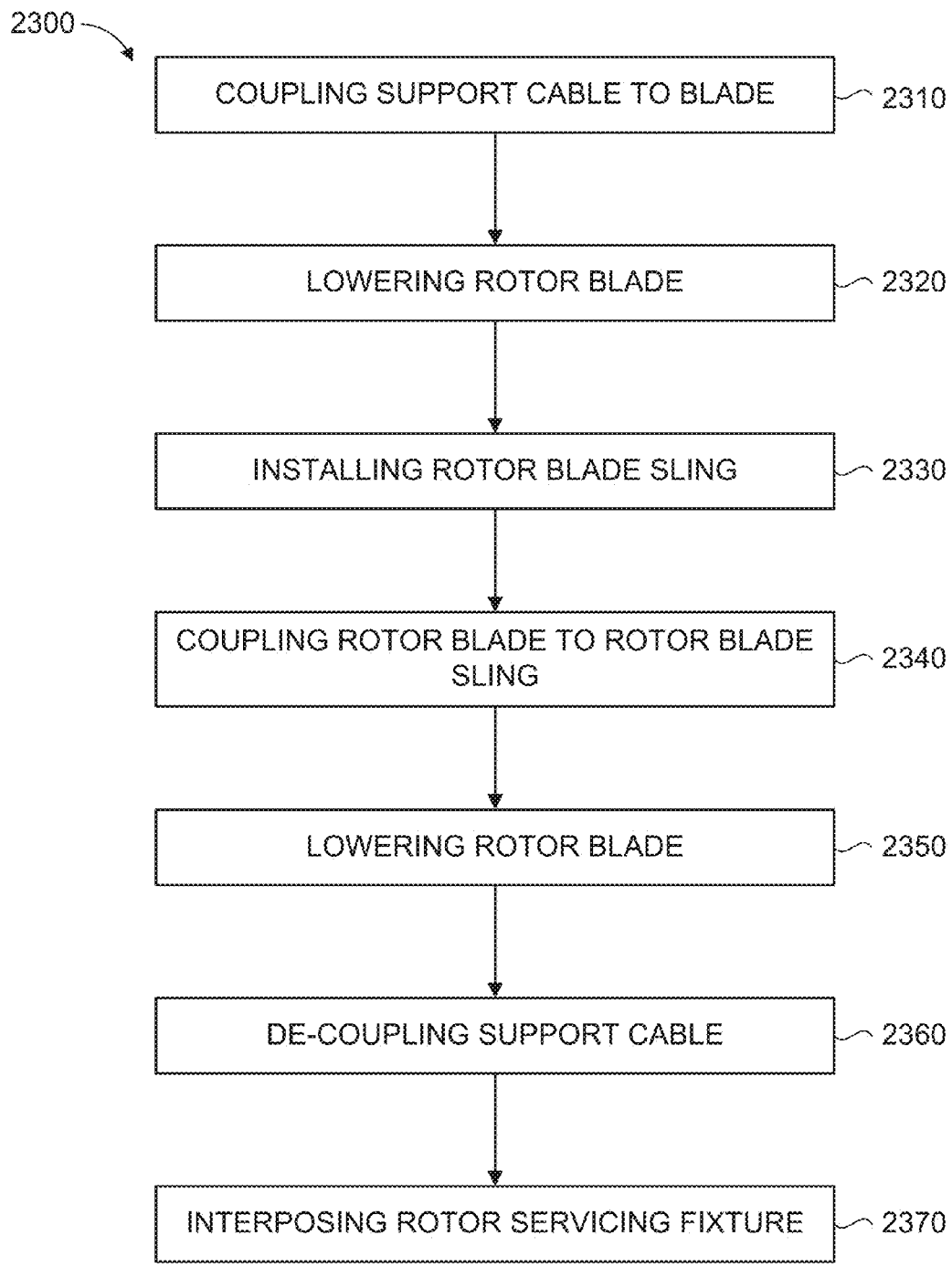
FIG. 23 illustrates a flowchart of a method for servicing a rotor of a wind turbine, in accordance with aspects of the present subject matter.

FIG. 23 illustrates a flowchart of a method for servicing a rotor of a wind turbine, according to an aspect of the present invention. The method 2300 includes a coupling step 2310 that couples at least one support cable (e.g., 302) to the blade root 24 or blade 22. The support cable extends from the blade root 24 and into a hub 20 of the wind turbine. A lowering step 2320 lowers the rotor blade 22 relative to the hub 20 using the support cable 302 such that the rotor blade 22 is spaced apart from the hub 20 by an initial vertical distance 146. An installing step 2330 installs a rotor blade sling 1900 on the rotor 18. The rotor blade sling 1900 is configured to support the rotor blade 22 that is in the 6 o'clock position. A coupling step 2340 couples the rotor blade 22 to the rotor blade sling 1900. A lowering step 2350 lowers the rotor blade 22 such that the rotor blade 22 is spaced apart from the hub by a distance slightly greater than the initial vertical distance 146. A de-coupling step 2360 de-couples the support cables from the blade root 24 or rotor blade 22. An interposing step 2370 interposes a rotor servicing fixture 2000 between the rotor blade 22 (at the 6 o'clock position) and the hub 20. The rotor servicing fixture 2000 is configured to transport a rotor part via a crane to or from the rotor 18 or hub 20.

The method also permits the rotor servicing fixture 2000 to be interposed between the hub 20 and rotor blade 22 without any obstructions, and this enables large items, like the pitch bearing 150, to be removed and installed with the rotor blade still connected to the rotor (e.g., via rotor blade sling 1900). This method could be used to construct new wind turbines or service, maintain or repair existing wind turbines. Further, a low cost, low weight capacity crane, or an up-tower hoist or other equivalent device can be used to lower/raise the rotor servicing fixture 2000.

Figure 24:
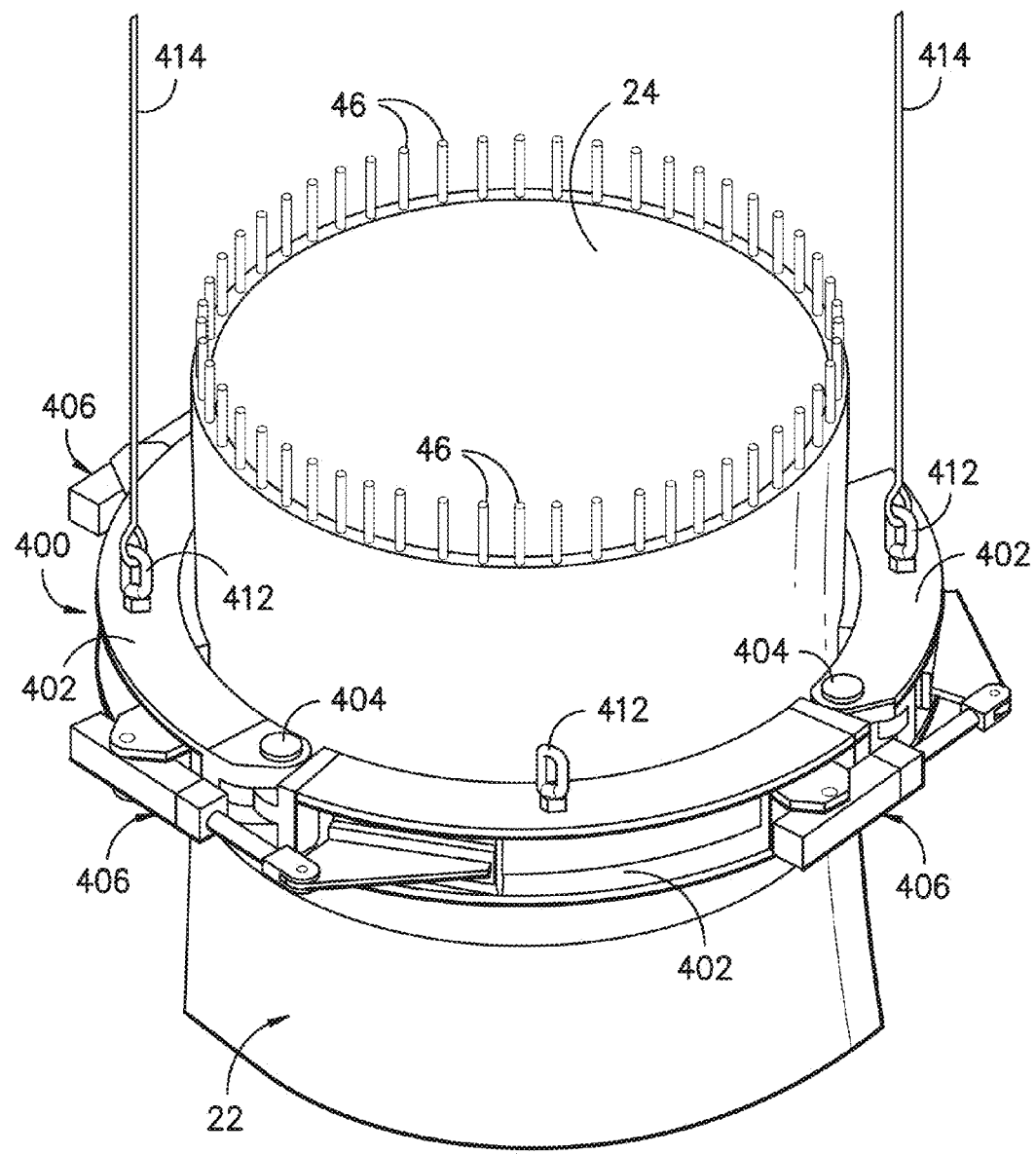
FIG. 24 illustrates a perspective view of the clamp assembly installed around a portion of the blade root of a rotor blade, in accordance with aspects of the present subject matter.
Figure 25:
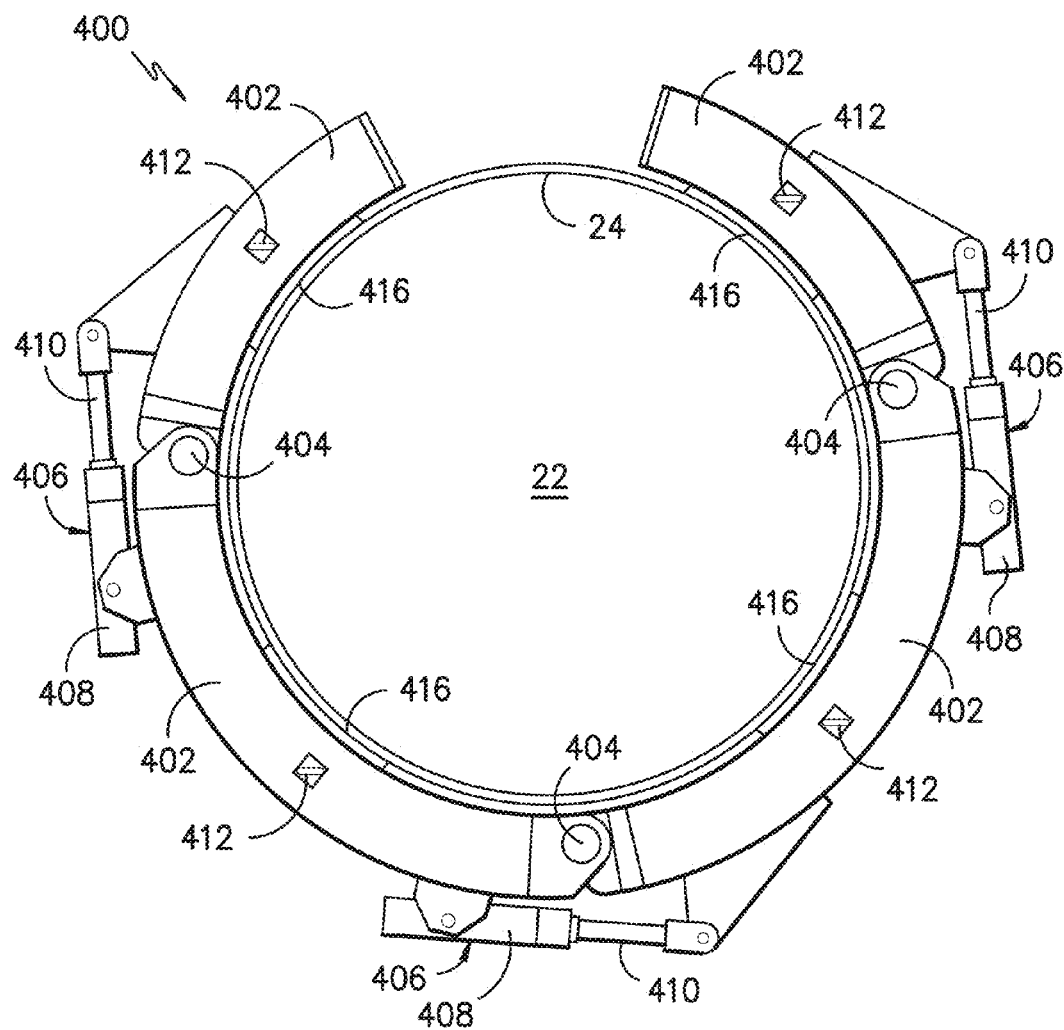
FIG. 25 illustrates a top view of the clamp assembly and rotor blade, both of which are shown in FIG. 24, in accordance with aspects of the present subject matter.

Referring now to FIGS. 24 and 25, a clamp assembly 400 that may be utilized as an alternative means for coupling one or more cables to the rotor blade 22 for performing any of the various steps of the methods disclosed herein is illustrated in accordance with aspects of the present subject matter. Specifically, FIG. 24 illustrates a perspective view of the clamp assembly 400 installed around a portion of the blade root 24 of a rotor blade 22. Additionally, FIG. 25 illustrates a top view of the clamp assembly 400 and rotor blade 22 shown in FIG. 24.

In general, the clamp assembly 400 may include a plurality of curved clamp members 402 configured to be engaged around the outer circumference of the rotor blade 22. Specifically, each clamp member 402 may be configured to extend circumferentially around a portion of the blade root 24 of the rotor blade 22. In several embodiments, each clamp member 402 may be configured to be coupled to any adjacent clamp member(s) 402 via a pivotal connection. For example, as particularly shown in FIG. 25, a hinge pin 404 may be configured to extend through the ends of each pair of adjacent clamp members 402, thereby allowing such clamp members to be pivoted or rotated relative to one another. As such, when the clamp assembly 400 is properly positioned along the blade root 24 at its desired installation location, the clamp members 402 may be pivoted relative to one another to allow the clamp assembly 400 to be tightened and/or engaged around the blade root 24.

It should be appreciated that, in general, the clamp members 402 may be configured to be actuated or otherwise rotated relative to one another using any suitable actuating means known in the art. For example, in several embodiments, a suitable actuating cylinder 406 (e.g., an electric cylinder or a fluid-driven cylinder) may be coupled between each pair of adjacent clamp members 402 so that the cylinder 406 extends across the joint formed between the clamp members 402 via the hinge pin 404. As particularly shown in FIG. 25, each actuating cylinder 406 may include a piston cylinder 408 coupled to one of the adjacent clamp members 402 and a piston rod 410 coupled to the other adjacent clamp member 402. As such, when the piston rod 410 is actuated relative to piston cylinder 408, the adjacent clamp members 402 may be rotated relative to one another, thereby allowing the clamp members 402 to be engaged around and/or disengaged from the rotor blade 22.

As shown in FIGS. 24 and 25, the clamp assembly 400 may also include one or more coupling devices 412, such as mount rings, secured to one or more of the clamp members 402 to allow a suitable cable(s) 414 to be coupled to the assembly 400. For instance, to initially install the clamp assembly 400 around the rotor blade 22, one or more cables 414 may be coupled to the clamp assembly 400 to allow the assembly 400 to be properly positioned vertically relative to the rotor blade 22, such as by coupling suitable lift cables to the clamp assembly 400 so that the assembly 400 may be lifted from the support surface 14 to a desired installation location on the rotor blade 22.

In addition, when raising or lowering the rotor blade 22 relative to the hub 20, a suitable cable(s) 400 may be secured to one or more of the clamp members 402 to allow the rotor blade 22 to be up or down via such cable(s). For instance, one or more support cables may be secured to the clamp assembly 400 to allow the rotor blade 22 to be initially lowered from the hub 20 by the initial vertical distance 146. Similarly, one or more pulley cables may be coupled to the clamp assembly 400 to allow the rotor blade 22 to be lowered or raised.

It should be appreciated that, in several embodiments, one or more clamp pads 416 may be secured to one or more of the clamp members 402 such that the clamp pads 416 are positioned directly between the clamp member(s) 402 and the rotor blade 22 when the clamp assembly 400 is installed around the blade root 24. In one embodiment, the clamp pads 416 may have a friction coating or surface that allows for improved gripping of the rotor blade surface when the clamp members 402 are engaged around the blade root 24. Alternatively, the clamp pads 416 may be formed from a foamed material or other suitable cushioning material so as to provide a layer of protection for the outer surface of the rotor blade 22.

The method and system of the present invention demonstrates substantially improved results that were unexpected because the hub 20 or rotor 18 can now be serviced without the use of an expensive crane that is capable of lifting the entire rotor 18 or an entire blade 22. Hub, blade and rotor service is now more inexpensive and may be faster due to the fact that an expensive and limited availability crane does not have to be used. Further, maintenance and service costs are greatly reduced and that makes wind energy more competitive economically with others forms of power generation (e.g., fossil fuels, nuclear, solar, hydro, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for enabling servicing of a rotor of a wind turbine, the method comprising:
   positioning a rotor blade of the rotor in a substantially six o'clock position;
   coupling at least one support strap to a blade root of the rotor blade, wherein the at least one support strap extends from the blade root and into a hub of the wind turbine;
   lowering the rotor blade relative to the hub using the at least one support strap such that the rotor blade is spaced apart from the hub by an initial vertical distance;
   installing a rotor blade sling on the rotor by sliding a loop of the rotor blade sling over at least one rabbit-eared rotor blade in at least one of a ten o'clock position or a two o'clock position, the rotor blade sling further having one or more support cables that extend downward from the hub;
   coupling the rotor blade to the one or more support cables of the rotor blade sling;
   lowering the rotor blade such that the rotor blade is spaced apart from the hub by a distance greater than the initial vertical distance;
   de-coupling the at least one support strap from the blade root; and
   interposing a rotor servicing fixture between the rotor blade and the hub, the rotor servicing fixture being configured to transport a rotor part.

2. The method of claim 1, wherein the rotor servicing fixture is generally C-shaped so that it can fit around the hub.

3. The method of claim 2, wherein the rotor servicing fixture includes an attachment point located above a rotor part mounting area.

4. The method of claim 3, wherein the rotor servicing fixture includes a counterweight located near an end of an upper arm of the rotor servicing fixture.

5. The method of claim 4, wherein the rotor part mounting area is generally Y-shaped.

6. The method of claim 5, wherein at least a portion of a hub facing portion of the rotor servicing fixture includes one or more padded members, the padded members configured to protect the hub.

7. The method of claim 6, wherein the rotor servicing fixture includes one or more legs configured to maintain the rotor servicing fixture in an upright position when the rotor servicing fixture is resting on a ground surface.

8. The method of claim 1, further comprising:
   installing a blade sock around an outer perimeter of the rotor blade at an intermediate location defined between the blade root and a blade tip of the rotor blade, wherein a plurality of tag lines are attached to the blade sock and are configured to extend to one or more support members.

9. The method of claim 1, wherein a support nut is mounted at least partially though the blade root, wherein coupling the at least one support strap to the blade root comprises coupling the at least one support strap to a coupling device extending from the support nut.

10. The method of claim 9, further comprising:
    installing a cable translation device within the hub; and
    operatively associating the at least one support strap with the cable translation device such that the at least one support strap extends from the support nut through a portion of the cable translation device.

11. The method of claim 10, further comprising:
    removing a barrel nut from the blade root of the rotor blade; and
    replacing the barrel nut with the support nut.

12. A method for enabling servicing of a rotor of a wind turbine, the method comprising:
    positioning a rotor blade of the rotor in a substantially six o'clock position;
    lowering the rotor blade relative to a hub of the wind turbine using a support strap such that the rotor blade is spaced apart from the hub by an initial vertical distance;
    installing a rotor blade sling on the rotor by sliding a loop of the rotor blade sling over at least one rabbit-eared rotor blade in at least one of a ten o'clock position or a two o'clock position, the rotor blade sling further having one or more support cables that extend downward from the hub;

coupling the rotor blade to the one or more support cables of the rotor blade sling; and interposing a rotor servicing fixture between the rotor blade and the hub, the rotor servicing fixture being configured to transport a rotor part.

13. The method of claim 12, wherein the rotor servicing fixture is generally C-shaped so that it can fit around the hub, and wherein the rotor servicing fixture includes an attachment point located above a rotor part mounting area.

14. The method of claim 12, wherein the rotor servicing fixture includes a counterweight located at an end of an upper arm of the rotor servicing fixture.

15. The method of claim 12, wherein the rotor part mounting area is generally Y-shaped.

16. The method of claim 12, wherein at least a portion of a hub facing portion of the rotor servicing fixture includes one or more padded members, the padded members configured to protect the hub.

17. The method of claim 12, wherein the rotor servicing fixture includes one or more legs configured to maintain the rotor servicing fixture in an upright position when the rotor servicing fixture is resting on a ground surface.

18. The method of claim 12, wherein a support nut is mounted at least partially through a blade root of the rotor blade, the method further comprising coupling the support strap to the blade root by coupling the support strap to a coupling device extending from the support nut.

19. The method of claim 12, further comprising:

installing a cable translation device within the hub; and operatively associating the support strap with the cable translation device such that the support strap extends from the support nut through a portion of the cable translation device.

\* \* \* \* \*